United States Patent
Dangi et al.

(10) Patent No.: US 6,763,476 B1
(45) Date of Patent: Jul. 13, 2004

(54) ENHANCED TIMER QUEUE MECHANISM FOR DYNAMIC CAPACITY INCREASE

(75) Inventors: Salil Dangi, Mission Viejo, CA (US); Roger Andrew Jones, Mission Viejo, CA (US)

(73) Assignee: Unisys Corporation, Blue Bell, PA (US)

( * ) Notice: Subject to any disclaimer, the term of this patent is extended or adjusted under 35 U.S.C. 154(b) by 672 days.

(21) Appl. No.: 09/825,118

(22) Filed: Apr. 3, 2001

(51) Int. Cl.$^7$ ................................................ G06F 1/04

(52) U.S. Cl. ....................................... 713/502; 713/600

(58) Field of Search ................................ 713/500, 501, 713/502, 600

(56) References Cited

U.S. PATENT DOCUMENTS

| | | | | | |
|---|---|---|---|---|---|
| 5,502,719 A | * | 3/1996 | Grant et al. | ................. | 370/412 |
| 5,758,137 A | * | 5/1998 | Armstrong et al. | ......... | 713/502 |
| 6,032,207 A | * | 2/2000 | Wilson | ......................... | 710/54 |
| 6,647,505 B1 | * | 11/2003 | Dangi et al. | ................. | 713/502 |
| 6,714,959 B1 | * | 3/2004 | Dangi et al. | ................. | 718/102 |

* cited by examiner

*Primary Examiner*—Dennis M. Butler
(74) *Attorney, Agent, or Firm*—Alfred W. Kozak; Mark T. Starr; Nathan Cass

(57) ABSTRACT

A system and method using a timer management module for managing a circular queue having N Fixed Timer Entries (FTEs) to enable dynamic capacity increase of size M by extending the pointer array referencing the circular queue by M, copying the first "Current Timer Index" entries to the extended pointer array entries, allocating M FTEs, and linking the M FTEs within the circular queue.

9 Claims, 20 Drawing Sheets

EXTEND, COPY

STRUCTURE OF A TIMER ENTRY (TE)

PREV     =   POINTS TO PREVIOUS TIMER ENTRY IN THE QUEUE

WEIGHT=      0 FOR TTE/NTE
             1 FOR FTE

P1, P2   =   PARAMETERS SPECIFYING THE ACTION TO BE TAKEN
             WHEN THE REQUESTED DURATION HAS ELAPSED

NEXT     =   POINTS TO NEXT TIMER ENTRY IN THE QUEUE

BEFORE NTE

AFTER NTE
(1) REPRESENTS 1 TICK

CTI = CURRENT TIMER INDEX

INITIAL QUEUE

EXTEND

COPY

ALLOCATE, SAVE, LINK

BREAK

JOIN

CONVERT

EXTEND, COPY

ALLOCATE, SAVE, LINK

BREAK, JOIN, CONVERT

TICK_ADJUST

ENHANCED TIMER QUEUE MECHANISM FOR DYNAMIC CAPACITY INCREASE

CROSS REFERENCE TO RELATED APPLICATIONS

This application is related to co-pending applications U.S. Ser. No. 09/602,692 entitled "System and Method For Optimizing Insertions For Timer Queue Operations" and U.S. Ser. No. 09/602,693 entitled "Deletion System And Method For Removing Transient Timer Entries From A Circular Queue" and is incorporated herein by reference.

FIELD OF THE INVENTION

The present invention generally relates to scheduling events in computers and system networks and in particular to dynamically increasing the capacity of a circular timer queue.

BACKGROUND OF THE INVENTION

In many computer networks, computerized telephone and billing systems, etc., there are intercommunication mechanisms in computers and other types of systems which handle multiple events, where such mechanisms are often presented with the problem of scheduling a certain event to happen at a particular time which is to be arranged for set-up in the system.

Many memory systems for example, have queues of items to be accessed or handled in a particular sequence. Many programs have lists of instructions which are sequenced also to be handled in a particular arrangement of time events. Sometimes, thousands of different items are placed in queues in order to be available for access in a particular sequence or order.

For example, in the compilation of a telephone directory or a directory of certain businesses in a certain location or a directory of the names of people associated with a certain group, these are all examples of data words or information which are placed in queues and which may be accessed, acquired and used or deleted at certain moments of time.

Additionally, once such a list is compiled, it is very often necessary to place insertions into the queue list, for example, new person's names may be added to a group organization list, or new telephone numbers and addresses and names may be put in a telephone book. Similarly, and often in Kerberos Security Systems, a list of authenticated users and appropriate passwords and tickets may be involved in a list of such useful items.

In each and any of the cases, when it is necessary to add to a particular list, it is sometimes a rather magnitudinous task to achieve this type of event when there is required the normal situation where the system must check through each of the items in the list step-by-step until it reaches its selected position where the insertion must be made, after which a stop operation must occur, and after which the new item is inserted into the system which performs the completion of this operation. However, in so doing, sometimes thousands and thousands of entries must be sequenced through to find the exact point where the new insertion is to be made. This is very time-consuming and exceedingly complex in terms of programming the request to be inserted at a particular point in a large sequence of other requests in a list.

The normal method for this to happen is that there be a sequential scan of each item, item-by-item, step-by-step, until there is reached or achieved the proper insertion point.

The performance cost of queue searching for inserting events which need to be handled at some fixed time in the future, is quite an expensive proposition. However, the queues which must be scanned sequentially are used very often for these purposes because they are simple to implement and maintain, and can reflect the linear nature of the problem to be solved in finding the correct placement point or item into which the new event is to be inserted. Additionally, such a technique is inherently slow, and thus also becomes increasingly costly, as more entries are added to the queue, and considerable time latency factors are involved in the mechanism which must traverse through the queue in order to find the right new entrance point.

Likewise, the same sort of difficulties arise when an inserted transient timer entry is now desired to be deleted and removed.

Traditionally, timer events are maintained in a queue structure, and each timer event has a value associated with it. The value of the timer event determines when the event would or should happen after the previous timer event has happened.

As an example, if five events are to happen at t+3, then t+8, then t+45, then t+55, then t+56, (where "t" is current time), then as an example, the queue may be considered to look as follows:

TE(3)—TE(5)—TE(37)—TE(10)—TE(1)

Where "t" is the current time and the bracketed value (X) represents the added time, for example, in seconds, which indicates the event as occurring just after the time count that the previous event had occurred.

In this particular operation, after one tick of time has occurred (that is to say, at t+1), then the timer queue could be represented to look as follows:

TE(2)—TE(5)—TE(37)—TE(10)—TE(1)

The difference here, is that the first item has now changed from TE(3) to now be TE(2).

With this type of scheme being used, it is seen to be very time-consuming to insert a transient timer entry in the queue, since the fixed timer entries need to be scanned from the "start" of the queue until the correct place is found. For example, if a temporary New Timer Entry (NTE) is to be added, for example, which is to happen after 48 ticks, then the entries of the timer queue will need to be scanned until an event is found which will happen after 48 ticks, and then the transient New Timer Entry (NTE) needs to be inserted just prior to that event. Thus, in the above example, it would be necessary to scan step-by-step for each of the entries.

Thus, in the above example, the timer queue after the new event insertion (NTE) will now appear as shown below:

TE(2)—TE(5)—TE(37)—NTE(4)—TE(6)—TE(1)

Thus, the New Timer Entry insertion which is NTE(4) required the scanning of four previous entries.

Now, in the situation where the queue has thousands of entries, this type of operation will be seen to be very time-consuming in order to provide for a new event insertion. Likewise later when the removal of a temporary New Timer Entry (NTE) was desired, the usual and ordinary solution was to sequence through each of the fixed timer entries until the temporary NTE was found so it could then be deleted. Here much wasteful time was consumed.

The present system involves a method for managing timer events and expanding the number of pre-existing fixed timer entries, FTEs. This does not require any scan of the existing entries in the queue, and as a result, provides for an extensive speeding-up for handling the sequence of events which are desired to be utilized in a queue. The new method uses the operation of the timer queue as if it were maintained as a circular queue. Here, the circular queue would have "N" permanent entries, where "N" is a chosen number, but an arbitrary one depending on the number of permanent entries or FTEs (fixed timer entries) that one would like to configure into the queue. Also, the number "N" then determines the maximum duration in timer ticks that can be handled by this type of configuration.

In the co-pending companion case, U.S. Ser. No. 09/602,692, the major focus was to provide the "insertion" of a transient or temporary timer entry designated as an NTE or new timer entry.

Still, in the co-pending companion case, U.S. Ser. No. 09/602,693, the major focus was to handle the problem of removing and deleting such a new timer entry (NTE) when it is no longer needed or useful.

The method of the present invention relates to dynamically allowing a timer queue to process NTEs with duration in timer ticks greater than the limit of the previous existing timer queue, thus increasing capacity for a larger number of FTEs. This is achieved by inserting additional FTEs to the circular queue and increasing the value of "N" to a new "N".

The system here contemplates a circular queue of "N" fixed timer entries (FTEs). A request to process an NTE (New Timer Entry) with a duration greater than N timer ticks is presented to the circular queue. Without the method of the present invention, the NTE could not be handled. Using the method of the present invention, however, the circular queue is expanded to a size allowing the requested duration to be handled through the dynamic insertion of new FTEs (Fixed Timer Entries).

For example, if the timer "tick" or "period" is 100 milliseconds, and "N" is 9,000, then this queue will be capable of handling any timer request within a period of 15 minutes. If a request for a duration of 20 minutes is made, the method of the present invention creates 3,000 additional FTEs in order to allow the processing of the request. This resets N to 12,000, making the queue capable of handling any timer request for a duration up to 20 minutes.

SUMMARY OF THE INVENTION

The present system provides for the utilization of a timer queue as a circular queue which has "N" permanent entries which are designated as Fixed Timer Entries (FTEs). The chosen number for the configuration, which is the number "N", determines the maximum duration of timer requests that can be handled.

The method involves allocating "N" fixed timer entries (FTEs) and assigning a timer value of "1" to each of these timer entries. These timer entries are linked to form a circularly linked list and the addresses of these timer entries are saved in an array which is used to access the fixed elements of the queue directly.

A "Current Timer Index" (current position in a circular Timer Queue, designated CTI) is assigned so that this is equivalent to the "Current Time In Ticks", mod "N".

In general operations, the system permits transient new timer entries (NTEs) to be inserted between two selected timer entries (TEs). This involves converting the requested duration to duration in terms of "timer ticks".

If the value of "timer ticks" exceeds "N", then the method of the present invention expands the circular queue by creating additional FTEs. The number of FTEs created depends on the number of timer ticks requested. For example, if N equals 10 and a request for an NTE at 15 timer ticks is made, then 5 additional FTEs are created. After creating the additional FTEs, "N" is set to the new number of FTEs, links are reassigned so as to preserve the circular queue, and $TICK_{13}$ ADJUST is recalculated so that "Current Timer Index" does not change.

Once the value of "timer ticks" is less than or equal to "N", the program will allocate a new timer entry (NTE), assign a timer value of "0" to this entry, then assign a handle to this entry. "Timer Index" is assigned the value of ($CURRENT_{13}$ $TIME_{13}$ $IN_{13}$ TICKS+$NEW_{13}$ $TIMER_{13}$ TICKS) mod "N". Then, there is made an insertion of this new timer entry (NTE) prior to the timer entry which is pointed-to by the "Timer Index" within the Timer Queue.

The method of the present invention is useful in a system including a timer management module for managing a circular queue having N fixed timer entries (FTEs). The program enables dynamic capacity increase of size M by extending the pointer array referencing the circular queue by M, copying the first "Current Timer Index" entries to the extended pointer array entries, allocating M FTEs, and linking the M FTEs for addition within the circular queue. Thus, the newly arranged number of total entries (FTEs) is the sum of N+M.

In order to provide a more understandable foundation for the present invention, a brief summary of the operations for insertion (U.S. Ser. No. 09/602,692) of Fixed Timer Entries (FTEs) will be outlined so as to enable a better appreciation of the present invention which enables the expansion of a queue from a previously-set number N of FTEs to an expanded number of FTEs (N+M). FIGS. 1, 2A, 2B and 3A illustrate the environment and factors of a circular queue. FIGS. 3B, 3C and 6A and 6B summarize the insertion of a new Transient Timer Entry (NTE).

FIGS. 4A–4G and 7A–7D provide the substance of the present invention which relates to taking a circular queue of N Fixed Timer Entries and expanding this queue to N+M Fixed Timer Entries for operation in a circular queue.

GLOSSARY

Figure 1:
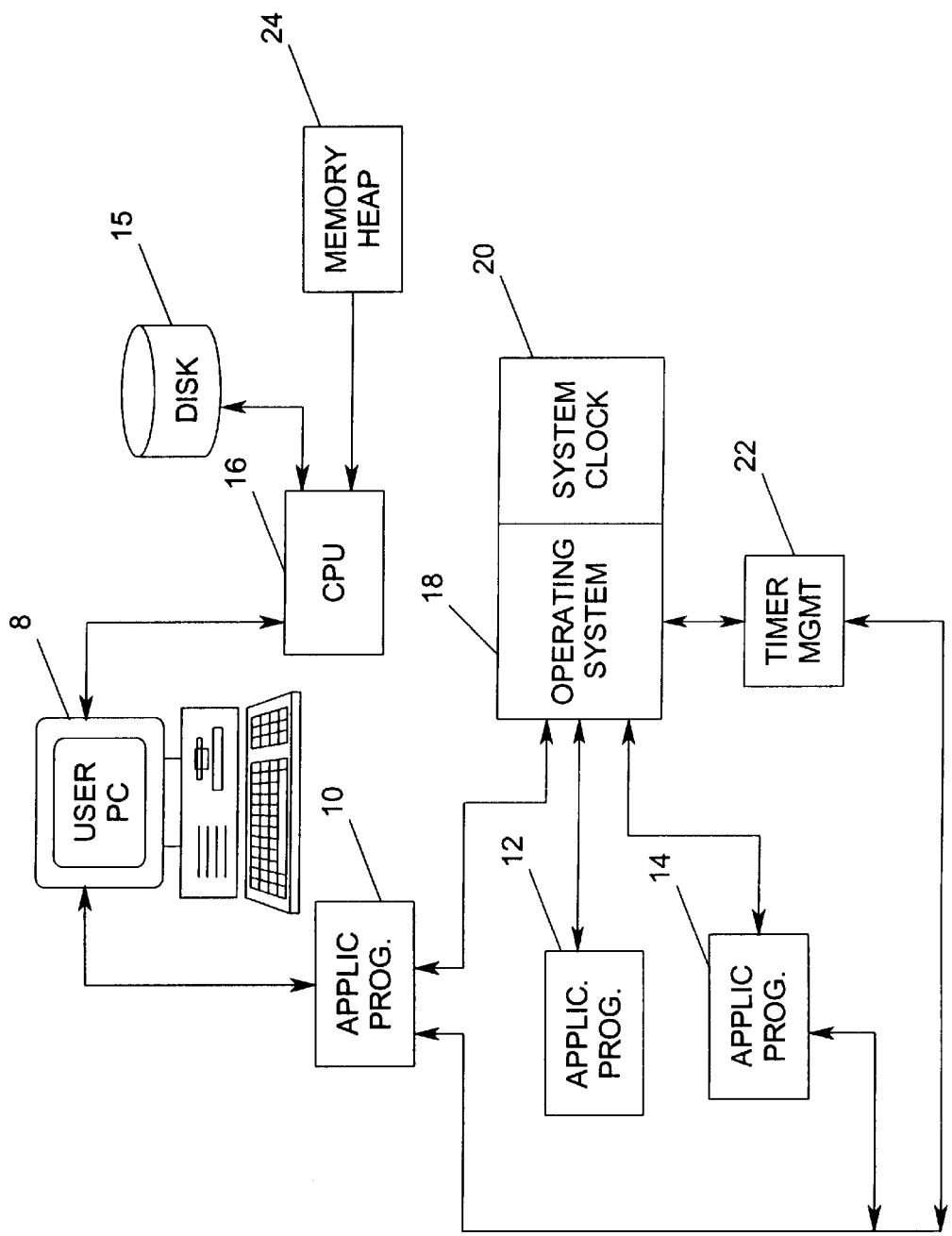
FIG. 1 is a block diagram showing an example of a system network which makes use of queue events.

ADDRESS ARRAY: An array of pointers where each pointer references a particular address in memory.

ARRAY INDEX: One entry within an array. The Array Index i within array A is denoted A[i].

CIRCULARLY LINKED LIST: A linked list wherein the last item is followed by the first item, thus forming a circle.

CLOCK: In computer circuitry, the electronic circuit that generates a steady stream of digital timing pulses that synchronize operations.

CURRENT TIME (t): The present System clock time, used to determine the "Current Timer Index".

CURRENT TIMER INDEX: The current position, or index, in a Timer Queue. Calculated by "Current Time In Ticks" MOD "N".

DELETE REQUEST: A request to delete a Transient Timer Entry (TTE) from a Timer queue. Contains a handle referencing the Transient Timer Entry to delete. TTE is also referred to as New Timer Entry (NTE) during the insertion process.

DOUBLE LINK: A pair of links between two adjacent TEs (Timer Entries) (e.g. "X" and "Y") consisting of a next pointer link from "X" to "Y" and a previous pointer link from "Y" to "X", permitting the traversal of a queue in either forward direction (by following the next pointer link) or reverse direction (by following the previous pointer link).

ENTRIES IN QUEUE: The entities making up a queue, such as individual people standing in line.

ENTRY: A requested process.

ENTRY INSERTION: See Timer Entry Insertion.

EVENT: The occurrence of the process associated with an Entry.

FIXED TIMER ENTRY (FTE): The fixed entries of a Timer Queue. Weight is always one Timer Tick.

HANDLE: A reference to an address in memory. Used to uniquely identify Transient Timer Entries (TTEs, NTEs) inserted into a Timer Queue. Handles do point to something but how the pointer is derived is up to the handle builder, e.g. a $timer_{13}$ handle could contain an index to an internal table where the timer related information is stored and a random number which is also stored in the same table. This will permit the handle builder to identify bogus handles as the caller will need to know both the index and the random number stored at that index.

INDEX: An integer representing a particular position within the circular queue. Index values start at 0 and end at the size of the circular queue minus 1 (or N−1). In a circular queue of size 5 (where N=5), an index value of 3 represents the 4th position in the circular queue.

INSERT REQUEST: A request to insert a New Transient Timer Entry (TTE) within a Timer Queue. Contains a Timeout value and parameter(s) specifying what the requested Entry will do.

LINEAR QUEUE METHOD: A method for inserting entries within a Queue. This method does not use the Address Array method. Instead, a new entry must iteratively search through the existing entries before entering the Queue. Due to the iterative search, adding new entries is an expensive operation.

MOD N: The remainder from doing a whole number divide by N.

N: The number of fixed entries in the Timer Queue.

NEW ENTRY INSERTION: See Timer Entry Insertion. Also called New Timer Entry (NTE) Insertion, and sometimes referred to as Transient Timer Entry (TTE) Insertion.

NEW TIMER ENTRY (NTE): A Timer Entry a client requests to be processed, typically a Transient Timer Entry, or TTE.

NEXT: Pointer pointing to the next Timer Entry. This is used for traversal in the forward direction.

P1, P2 PARAMETERS: Parameters that specify what Event will take place. P1 represents the procedure of the Event. P2 represents the parameter passed into the P1 procedure.

POINTER: Points to an item, using a reference to an address in memory.

PREV: Pointer pointing to the previous Timer Entry. This is used for traversal in the reverse direction.

QUEUE: A data construct processed in first-in, first-out (FIFO) order, similar to people waiting in line.

QUEUE STRUCTURE: An implementation of a Queue.

SYSTEM CLOCK: A computer's clock, tracking date and time of day, used to determine the Current time.

TIMEOUT: A time format that must first be converted into Timer Ticks. The format can be in System clock time, hours, minutes, seconds, etc.

TIMER: A device used to keep track of time.

TIMER ENTRY (TE): An Entry designated with a Weight, event parameters P1 and P2, a Previous pointer, and a Next pointer. Previous and Next pointers are used to form a Circularly linked list. Timer Entries can be Fixed Timer Entries (FTEs) or Transient Timer Entries, TTEs (also called NTEs or New Timer Entries during the insertion process).

TIMER ENTRY INSERTION: The process of inserting a new Transient Timer Entry in between Timer Entries in a Timer Queue.

TIMER ENTRY MANAGEMENT: Processing Entries based on sequential time arrangements.

TIMER INDEX: The position, or index, within a Timer Queue.

TIMER Q: An instance of a Timer Queue.

TIMER QUEUE: A Queue Structure consisting of Timer Entries, implemented as a Circularly linked list.

TIMER QUEUE INDEX ARRAY: An Address Array whose pointers map directly to the Fixed Timer Entries of a Timer Queue.

TIMER TICK: The fixed unit of time for a Timer Queue sequence between adjacent Fixed Timer Entries.

TRANSIENT TIMER ENTRY (TTE): A Timer Entry associated with a user request. Weight is always 0, P1 and P2 parameters specify what Event will take place. Also called a New Timer Entry or NTE during the insertion process.

WEIGHT: The number of Ticks representing how long a Timer Entry lasts. (1) represents 1 tick. A (0) represents no ticks (zero ticks).

GLOSSARY FOR FIG. 5:

.NEXT=the NEXT pointer of a particular TE.

.PREV=the PREV pointer of a particular TE.

COUNT=the current number of FTEs that have been created. This should equal N when Queue Creation completes, i.e., COUNT=N when an FTE has been created for each index within the Address Array.

N=the size of TQ (Timer Queue). The number of FTEs in a circular queue.

$TE_{13}$ PREV=references the TE previous to TE_THIS.

$TE_{13}$ THIS=a new instance of a FTE. One will be created for each index in the Timer Queue (TQ).

TQ=a new instance of a Timer Queue Index Array. Used for insert and delete operations.

TQ[0]=the $0^{th}$ index in TQ (Timer Queue).

TQ[COUNT−1]=the $(COUNT-1)^{th}$ index in TQ.

TQ[N−1]=the (N−1)$^{th}$ index in TQ.

GLOSSARY FOR FIG. 6 (INSERT OPERATION):
- .HANDLE=the handle referencing a particular TTE.
- .NEXT=the NEXT pointer of a particular TE.
- .P1=the P1 parameter of a particular TE.
- .P2=the P2 parameter of a particular TE.
- .PREV=the previous pointer of a particular TE.
- .WEIGHT=the WEIGHT value of a particular TE.
- $TE_{13}$ NEW=a new instance of a TTE. This is the entry to be inserted. Also referred to as New Timer Entry (NTE).
- $TE_{13}$ PREV=references the TE that $TE_{13}$ NEW will be inserted after.
- $TE_{13}$ NEW=the New Timer Entry (NTE) to be inserted. This is also called Transient Timer Entry or TTE.
- $TE_{13}$ THIS=references the FTE that TE_NEW will be inserted before.
- $TH_{13}$ NEW=a handle referencing TE_NEW.

GLOSSARY FOR FIG. 7 (CAPACITY INCREASE):
- .NEXT—the NEXT pointer of a particular TE.
- .PREV—the PREV pointer of a particular TE.
- CURRENT_TIME_IN_TICKS—value of the current time in ticks
- DEST—index destination into the timer queue (TQ) for the added FTE entries to copy into.
- I1—integer variable for calculating "Tick Adjust"
- I2—integer variable for calculating "tick Adjust"
- J—temporary index for iterating through timer queue (TQ).
- LQ1—the linear queue containing the original FTEs.
- LQ2—the linear queue containing the newly created FTEs.
- LQ3—the linear queue created by joining LQ1 and LQ2.
- LQ2HEAD—index into pointer array referencing the first FTE in LQ2.
- M—the number of new FTEs to be created and added in the circular queue.
- N—the size of timer queue (TQ) before expansion.
- SRC—index source into timer queue (TQ) containing values to copy from.
- $TE_{13}$ PREV—references the TE previous to $TE_{13}$ THIS.
- $TE_{13}$ THIS—used to reference a Timer Entry.
- TEMP—temporary value to remember the initial value of DEST
- TICK_ADJUST—because more indices become available after increasing the size of the circular queue, TICK_ADJUST must be added to CURRENT_TIME_IN_TICKS for all future calculations of "Current Timer Index".
- TQ[DEST]—entry in the pointer array (TQ) at index DEST.
- TQ[TEMP]—entry in the pointer array (TQ) at index TEMP.
- TQ[CURRENTTIMERINDEX]—entry in the pointer array (TQ) at index CURRENTTIMERINDEX.
- TQ[LQ2HEAD]—entry in the pointer array (TQ) at index LQ2HEAD.

DESCRIPTION OF PREFERRED EMBODIMENT

A typical example of a digital and computer operating system which may be involved with the use of queues, is illustrated in FIG. 1. For example, several different application programs shown as 10, 12, and 14 are initiated by the personal computer user 8, which also communicates with the Central Processing Unit 16. The Central Processing Unit, 16 is connected to a disk unit 15 which supplies instruction codes and other data and information to the CPU. The CPU also communicates with a memory heap 24 which, for example, can hold a series of data involving queue lists of information to be organized and managed.

The system clock 20 works with an operating system 18 which is in communication with the application programs 10, 12 and 14 and the CPU 16. A timer management unit 22 is controlled by the operating system and the application programs 10, 12 and 14, so that the timer management unit 22 can use the data in the memory heap 24 in order to manage and arrange a desired sequence of data items in a queue list which will be useful to the system shown in FIG. 1.

Figure 2A:
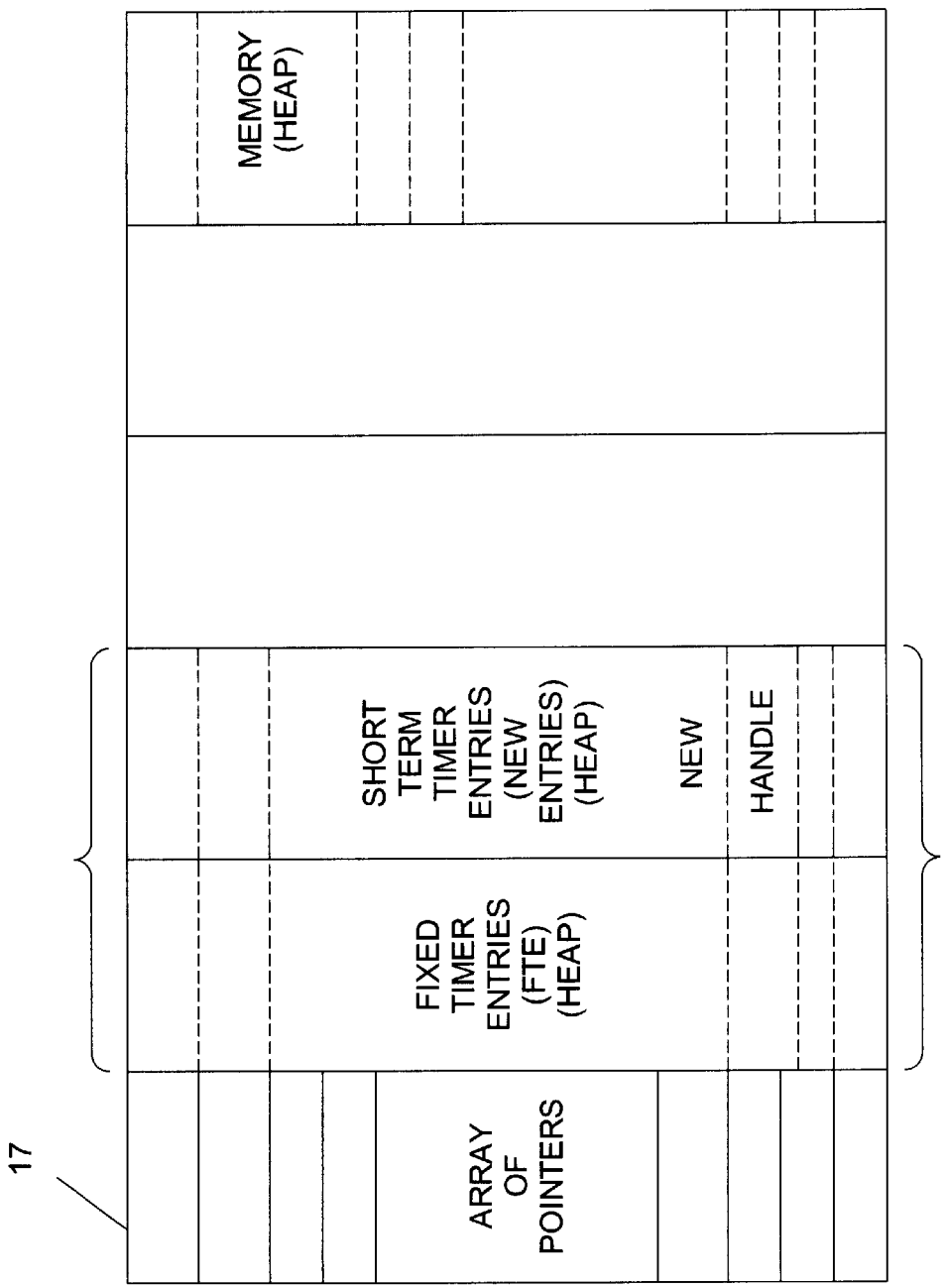
FIG. 2A is a schematic drawing showing the use of the memory heap and the array of pointers working with the timer management units which involve the fixed timer entries and the new short-term transient timer entries.
Figure 2B:
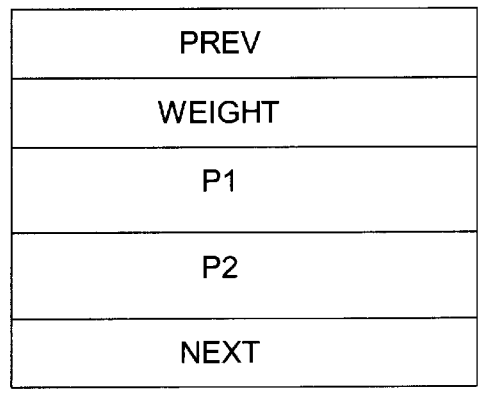
FIG. 2B is a schematic drawing showing the structure of a Timer Entry together with a description of the usage of the various fields.

FIG. 2A is an illustration of some of the major functional units involved in the present queue management method. A memory heap 24 can be used for holding data of use to the system and may have some specialized areas designated as the timer management area 22. This timer management area 22 can hold a multiple number of pointers and also short-term timer entries. An array of pointer addresses 17 can be initiated by the CPU 16 in order to access and manage the Fixed Timer Entries and the short-term timer entries, called Transient Timer Entries (TTEs) or New Timer Entries (NTEs) during the insertion process, in the timer management unit 22.

In many system networks, such as those which use Kerberos domains, the performance cost of queue searching for insertion of requests which need to be handled at some fixed time in the future, can involve costly time delays. An arrangement of queues is often used for inserting entries to be acted upon at some desired fixed time in the future and these queues are the easiest and simplest way to implement and maintain and to reflect the linear nature of the problem to be solved here.

Typical implementation of such a queue may involve searching the queue to find the appropriate insertion point and then perform the insertion of a particular piece of data in the queue. However, such a technique is inherently slow, and becomes increasingly more costly as more and more entries are added to the queue involved. The major difficulties are the time involved and the cost of mechanisms which must traverse throughout all the items in the queue in order to find the appropriate insertion point. This would involve what is called "linear sequencing".

Timer events which are organized and managed in a system network are generally maintained in a queue structure. Each timer event will have a value associated with it, and the value of the timer event determines when the event would happen after the "previous timer event" has happened. A timer queue (TQ) could be merely a linear sequence of events. However, the present queue configuration is organized as a circular queue as indicated in FIG. 3A and also in FIG. 4 which loops back upon itself.

In order to improve and implement a more efficient method for managing timer events, the present disclosure does not require any scan of the many fold existing entries in a queue. As a result, this speeds-up the insertion or deletion of selected events at any particular desired point in the queue. In the present method, the timer queue is now maintained as a "circular queue", (FIG. 3A). This circular queue will have "N" permanent entries where "N" is a selectively chosen number, but still an arbitrary number. This number "N" determines the maximum duration in timer ticks that can be handled by this particular scheme. For example, if the Timer tick is selected to be 100 milliseconds and the number of "permanent" entries "N" is selected as 9,000, then this queue will be able to handle any timer request with a duration up to 15 minutes after the selection point of the "current time".

Figure 3A:
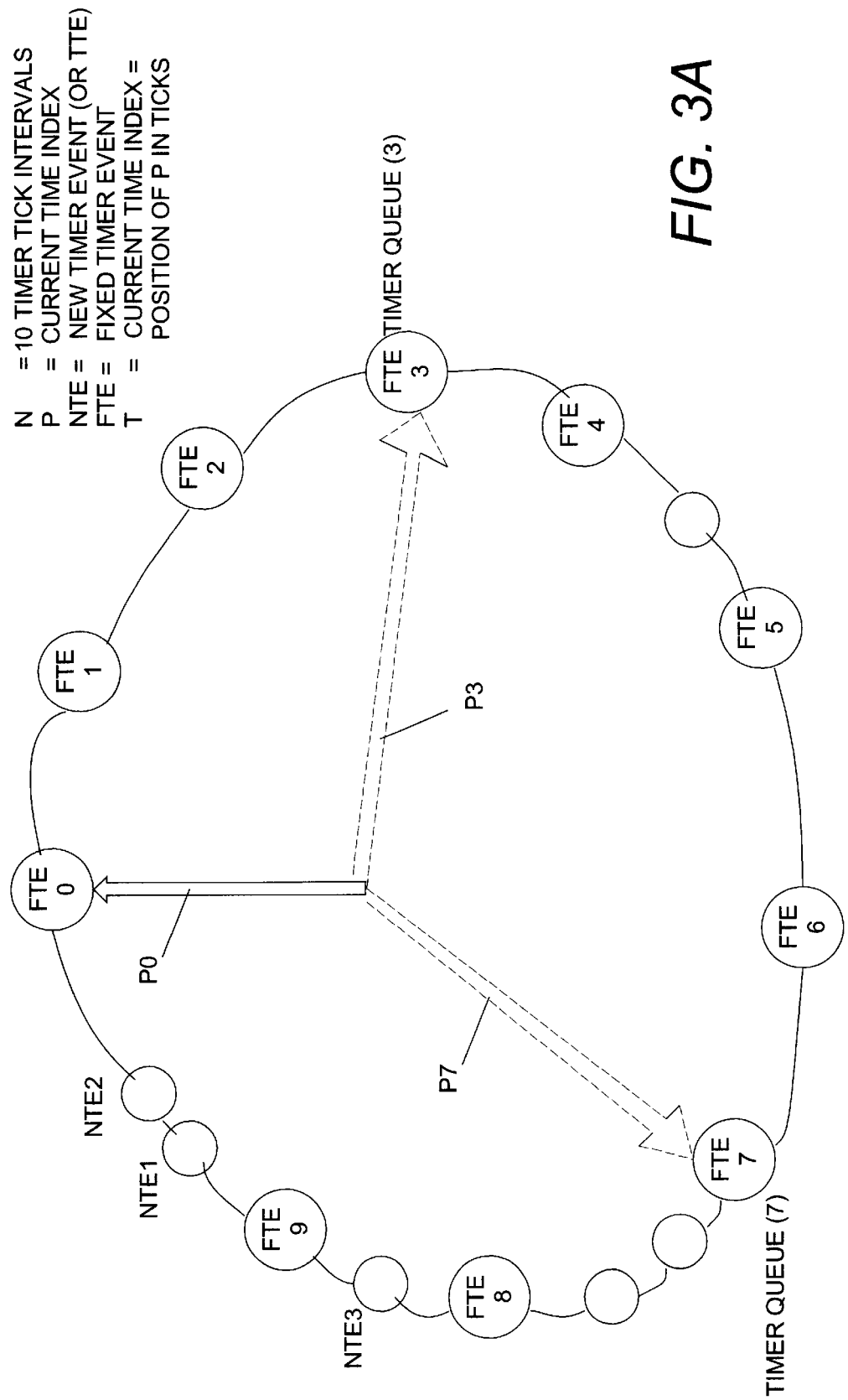
FIG. 3A is a schematic representation of the circular queue which is utilized and drawn for illustrative purposes.

Now referring to FIG. 3A, there is illustrated a circular queue, which for illustrative purposes, is shown to have 10 Fixed Timer Entries. A pointer P0 represents the Timer Queue Entry where "Current Timer Index" has the value 0. This however, is an adjustable item in time and may, for example, be located at P3, when the "Current Timer Index" has the value 3.

The first step involved would be an "initialization step" where the timer management module 22 would allocate "N" Fixed Timer Entries (FTEs), which in this case, the "N" would be equal to 10 (0–9). Then there is assigned a "WEIGHT" value of "1" to each of these Fixed Timer Entries (FTEs). The timer entries are arranged so as to form a circularly-linked list. Then, the addresses of each of these timer entries are saved in an array designated (Timer Q [n]). This is an array 17 (FIG. 2A) that is used to access the fixed elements of the queue directly. Then, a "Current Timer Index" (FIG. 3A) is assigned as the current$_{13}$ time__in ticks mod N.

The next step is for "entry insertion" and involves first converting the requested duration to Timer ticks. However, if the Timer ticks are greater than "N", then the program must exit since the set-up is not sufficient in size to handle this.

The next step for entry insertion of a New Timer Entry (NTE) is to allocate a Timer Entry and then assign a weight of "0" to this entry. The next step is to assign (current$_{13}$ time$_{13}$ in$_{13}$ ticks+new$_{13}$ timer$_{13}$ ticks) mod N to "this Timer Index". The next step is to insert this New Timer Entry (NTE) "prior" to the timer entry pointed to by the timer Q [this Timer Index].

As an illustrative example such as shown in FIG. 3A, this example will assume "N" to be 10, and the Timer tick to be 1 second. Thus, the Timer queue at initialization will present the following appearance.

TABLE I

| Timer Queue Index |
| --- |
| FTE0 (1) ←timerQ [0] |
| FTE1 (1) ←timerQ [1] |
| FTE2 (1) ←timerQ [2] |
| FTE3 (1) ←timerQ [3] |
| FTE4 (1) ←timerQ [4] |
| FTE5 (1) ←timerQ [5] |
| FTE6 (1) ←timerQ [6] |
| FTE7 (1) ←timerQ [7] |
| FTE8 (1) ←timerQ [8] |
| FTE9 (1) ←timerQ [9] |

Table I shows the designation FTE as the Fixed Timer Entry which correlates with the markers on FIG. 3A. The (1) designates one Timer tick and it will be noted that the timer Q[0] and the timer Q[1] and timer Q[2], etc., all designate separate and individual Timer Indexes. Thus, it will be noted that each new tick (1) indicates an advancement of one timer step from the previous timer Q index.

It will be noted that the "Current Timer Index" originally referenced FTE0, (indicated by P0 in FIG. 3A) and "Current Timer Index" will advance with each tick, so that, for example, after 3 Timer tick intervals it references FTE3 (indicated by P3 in FIG. 3A). Here, it will be noted that the so-called current time "t" changes with each Timer tick interval so that for example, with the pointer at P3, the "Current Timer Index" is now located at FTE3, where as previously indicated, the designation FTE is the Fixed Timer Entry. Now assuming that the current time "t" is given a numerical or digital designation as 1234567. With this designation, the "Current Timer Index" will be 7, (P7), FIG. 3A. That is to say, 1234567 "current time" moment at FTE7, in a circular queue of 10 FTEs where "N"=10 (total FTEs).

TIMER ENTRY INSERTION:

Now assuming that a New Timer Entry (NTE) (TE__NEW) is to be added for 3 ticks with "Current Timer Index" equal to 7. There is then allocated a New Timer Entry designated (NTE1) [TE__NEW(1)]. Now, a calculation is made so that this designated Timer Index is to be "0", that is to say, 1234567+3 mod 10, (i.e. 3 ticks past Index 7). Thus, it is now desired that NTE1 be inserted prior to FTE0 as seen in FIG. 3A. (NTE1 will be inserted "previous" to FTE0. Thus, after insertion of NTE1 (New Timer Entry) the timer queue will then appear as follows shown in Table II.

TABLE II

| Timer Queue Index |
| --- |
| TE__NEW (1) → NTE1 (0) |
|     FTE0 (1) ←timerQ [0] |
|     FTE1 (1) ←timerQ [1] |
|     FTE2 (1) ←timerQ [2] |
|     FTE3 (1) ←timerQ [3] |
|     FTE4 (1) ←timerQ [4] |
|     FTE5 (1) ←timerQ [5] |
|     FTE6 (1) ←timerQ [6] |
|     FTE7 (1) ←timerQ [7] |
|     FTE8 (1) ←timerQ [8] |
|     FTE9 (1) ←timerQ [9] |

Here, it will be noted that the 3 Timer ticks after FTE7(1) will then pass as ticks from FTE7 to FTE8, then FTE8 to FTE9, then FTE9 to FTE0, and then insert NTE1(0) just before (previous to) FTE0(1).

Now assuming that another New Timer Entry (NTE) is to be added for 3 Timer ticks with the "Current Timer Index" equal to 7, here an allocation is made for a New Timer Entry designated (NTE2). Now calculating this designated Timer Index to be "0", that is to say 1234567+(ticks) mod 10. It is now desired to insert NTE2 "previous" to the Fixed Timer Entry FTE0. This is seen in Table III, and in FIG. 3A.

TABLE III

| Timer Queue Index | | |
| --- | --- | --- |
| TE__NEW (1) → NTE1 (0) | | |
| TE__NEW (2) → NTE2 (0) | | |
| FTE0 (1) | timerQ [0] | |
| FTE1 (1) | timerQ [1] | |
| FTE2 (1) | timerQ [2] | |
| FTE3 (1) | timerQ [3] | |
| FTE4 (1) | timerQ [4] | |
| FTE5 (1) | timerQ [5] | |
| FTE6 (1) | timerQ [6] | |
| FTE7 (1) | timerQ [7] | |
| FTE8 (1) | timerQ [8] | |
| TE__NEW (3) → NTE3 (0) | | |
| FTE9 (1) | timerQ [9] | |

Thus, as will be seen in Table III, there has now been inserted a New Timer Entry designated NTE2(0) which occurs just after the Timer Entry NTE1(0) and "previous" to FTE0(1). It should be noticed that NTE1(0) and NTE2(0) have "0" in the notation to indicate "no timer ticks" are involved. Thus, from FTE9(1) to FTE0(1), the NTE1(0) and the NTE2(0) inserts still have only consumed one tick, but no timer ticks were used for NTE1 and NTE2.

This is shown in FIG. 3A, such that after the positioning of Timer Entry NTE1 there is shown another positioning of NTE2 which occurs before (previous to) the fixed timer entry FTE0.

As a further example, it is assumed that another New Timer Entry (NTE) is to be added for 2 Timer ticks with "Current Timer Index" equal to 7. Here, there is allocated a New Timer Entry designated (NTE3). The calculation for this Timer Index is then set to be 9, that is to say, 1234567+2 mod 10. Here, it is desired to insert NTE3 just previous to the Fixed Timer Entry FTE9.

After the insertion of NTE3 just previous to the Fixed Timer Entry 9, the timer queue after this insertion of NTE3 will appear as shown in Table IV.

TABLE IV

Timer Queue Index

| | | |
|---|---|---|
| TE_NEW (1) → | NTE1 (0) | |
| TE_NEW (2) → | NTE2 (0) | |
| | FTE0 (1) | timerQ [0] |
| | FTE1 (1) | timerQ [1] |
| | FTE2 (1) | timerQ [2] |
| | FTE3 (1) | timerQ [3] |
| | FTE4 (1) | timerQ [4] |
| | FTE5 (1) | timerQ [5] |
| | FTE6 (1) | timerQ [6] |
| | FTE7 (1) | timerQ [7] |
| | FTE8 (1) | timerQ [8] |
| TE_NEW (3) → | NTE3 (0) | |
| | FTE9 (1) | timerQ [9] |

Now, as seen in Table IV, in addition to the series of Fixed Timer Entries 0 through 8, the prior position of FTE9 is the "Current Timer Index" so that the new Timer Entry NTE3 is now inserted just before the Fixed Timer Entry 9, as seen also in FIG. 3A.

Since the Timer Index in this case is equal to 7+2 Timer ticks, then the jump from 7 to 8, and 8 to the next event is 2 ticks, which puts the positioning of NTE3(0) [$TE_{13}$ NEW(3)] just next after the Fixed Timer Entry FTE8(1), and before, in sequence, the Fixed Timer Entry of FTE9.

Figure 3B:
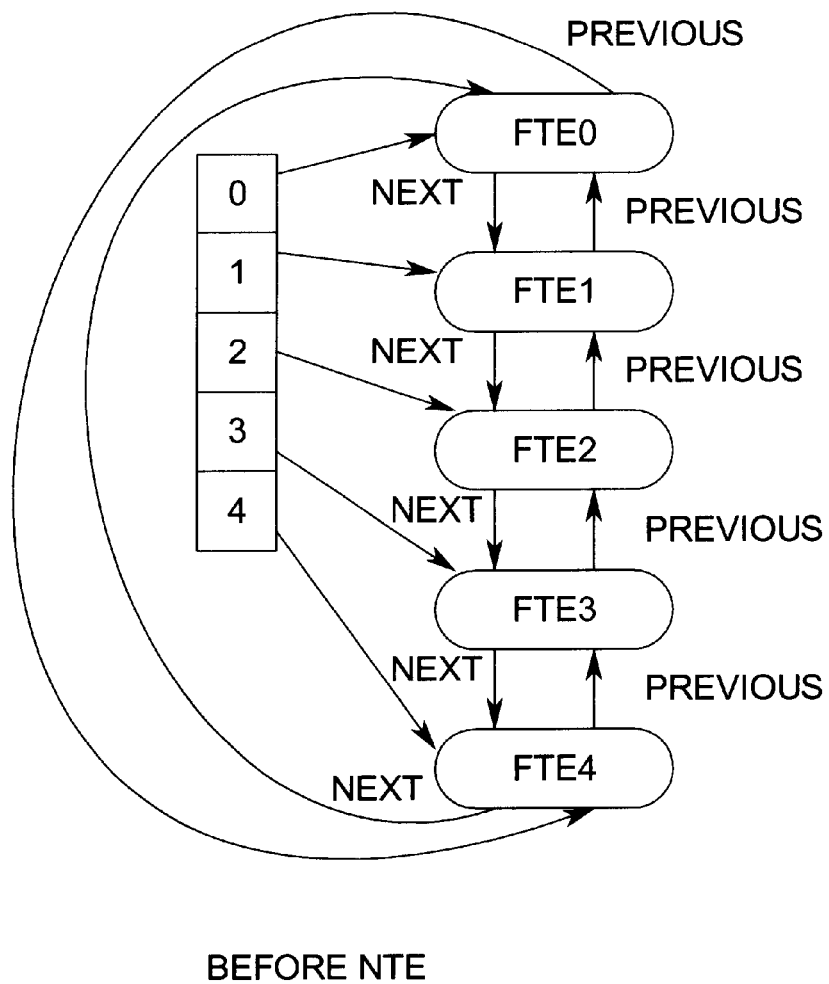
FIG. 3B is an illustration of pointers used for relating previous and next references to each Fixed Timer Entry before insertion of a new transient timer entry.

FIG. 3B is a simplified illustration of inserting a New Timer Entry (NTE) between two sequential Timer Entries (TEs).

FIG. 3B shows an example of a simplified pointer array (mod 5) of addresses 0–4 with each address pointing to Fixed Timer Entries FTE0, FTE1, FTE2, FTE3, and FTE4 which (in circular fashion) sequences back to FTE0. The FTEs are shown linked in sequence "0" to "4" and back to "0", and each FTE has a "previous" entry and a "next" entry. FIG. 3B is the situation "before" any New Timer entries are inserted.

Figure 3C:
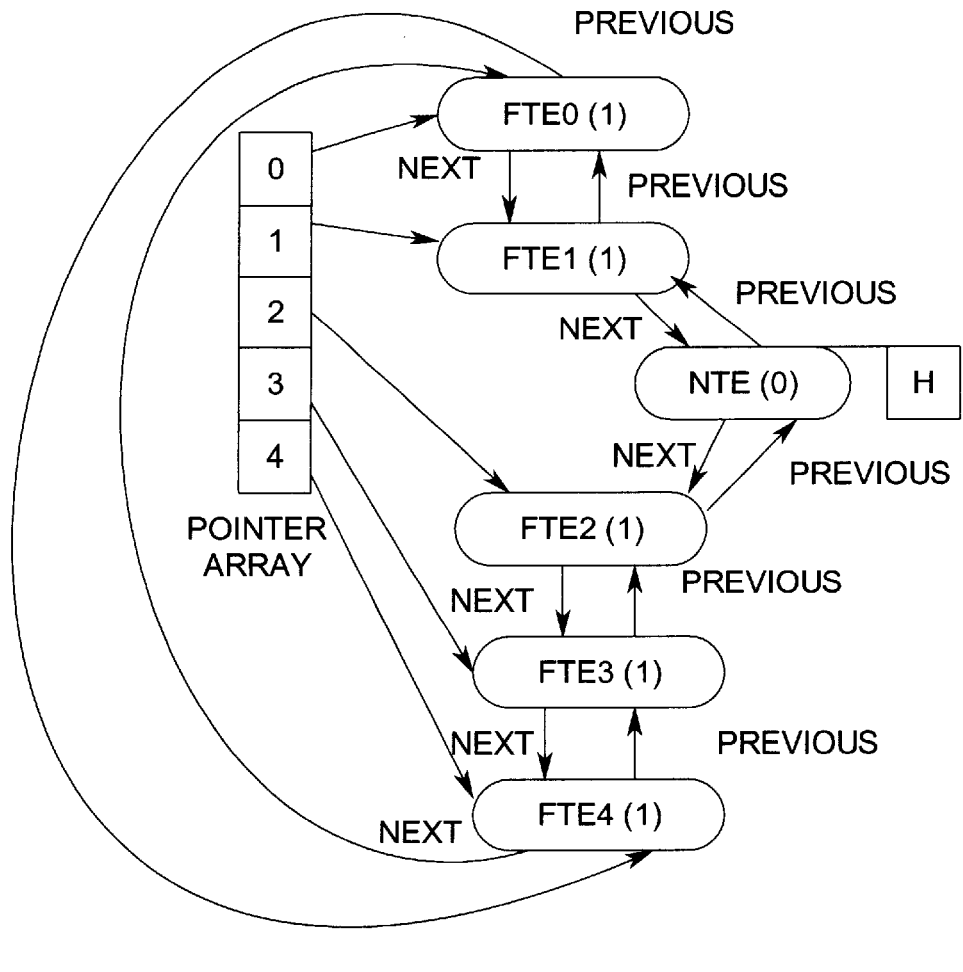
FIG. 3C illustrates the insertion of a transient entry between two fixed entries.

Now, when it is desired to insert a New Timer Entry (NTE) between FTE1 and FTE2, the program of FIG. 3C will set the Timer Tick value to "0", then set the "Current Timer Index" (to indicate the placement of the new entry) to "Current Time In Ticks" mod N. Here N=5.

Now, FIG. 3C illustrates the situation "after" insertion of a New Timer Entry (NTE) and the use of the "next" and "previous" pointers.

Here then, there is a setting of the NTE Timer Index to ("Current Timer Index" plus "Timer Ticks") mod "N". This would index 0 plus 2 Timer Ticks, as the insertion point (NTE) to be "previous" to the FTE2.

The program then assigns the NTE's previous pointer to FTE1.

The program then assigns the NTE's next pointer to FTE2.

The program then assigns FTE1's next pointer to NTE. Thus, NTE fits in after FTE1 with 0 ticks.

The program then assigns FTE2's previous pointer to NTE. Thus, NTE fits in before FTE2 with 0 ticks.

A Handle (H) is then passed back to uniquely identify the NTE (New Timer Entry) within the Timer Queue, where it has now been inserted. While a pointer is said to point to an item, e.g., if pName is a character pointer and the name "SMITH" is stored at memory address #1234 and a value of #1234 is assigned to pName, then the name "SMITH" can be extracted. That is not the case with handles. The handles do not have a well known format. They do point to something but how the pointer is derived is up to the handle builder, e.g., a timer_handle could contain an index to an internal table where the timer related information is stored and a random number which is also stored in the same table. This will permit the handle builder to identify bogus handles as the caller will need to know both the index and the random number stored at that index.

The present method first requires the creation of a circular queue and then the insertion of new transient timer entries. These operations are discussed in connection with FIGS. 5, 6A, and 6B hereinbelow.

Figure 4A:
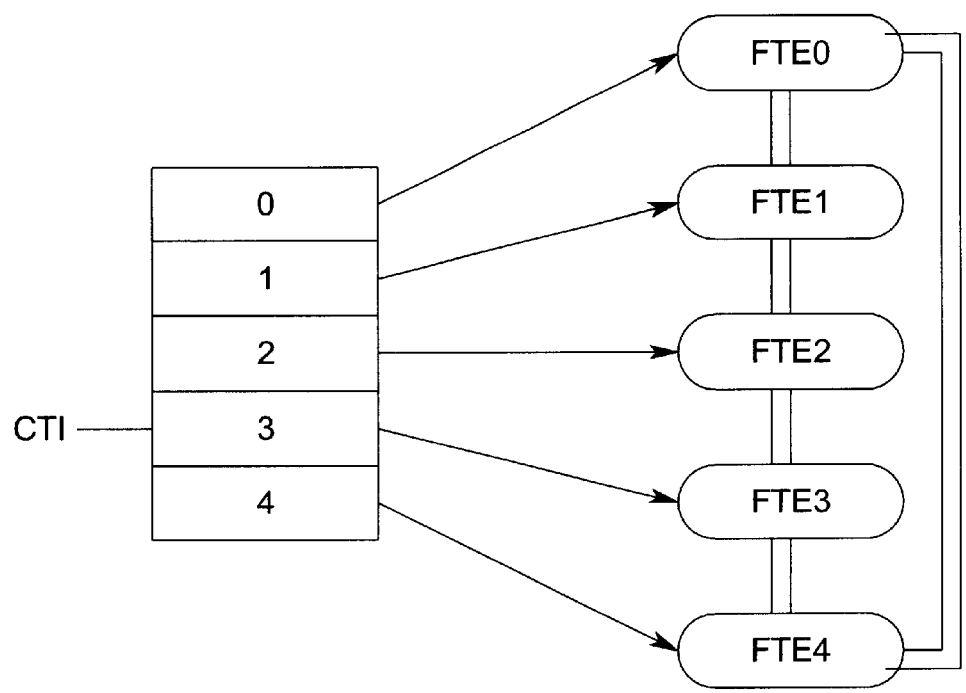
FIG. 4 is a schematic drawing of the steps involved in dynamically increasing the capacity of the circular queue, and includes FIGS. 4A through 4G.
Figure 4B:
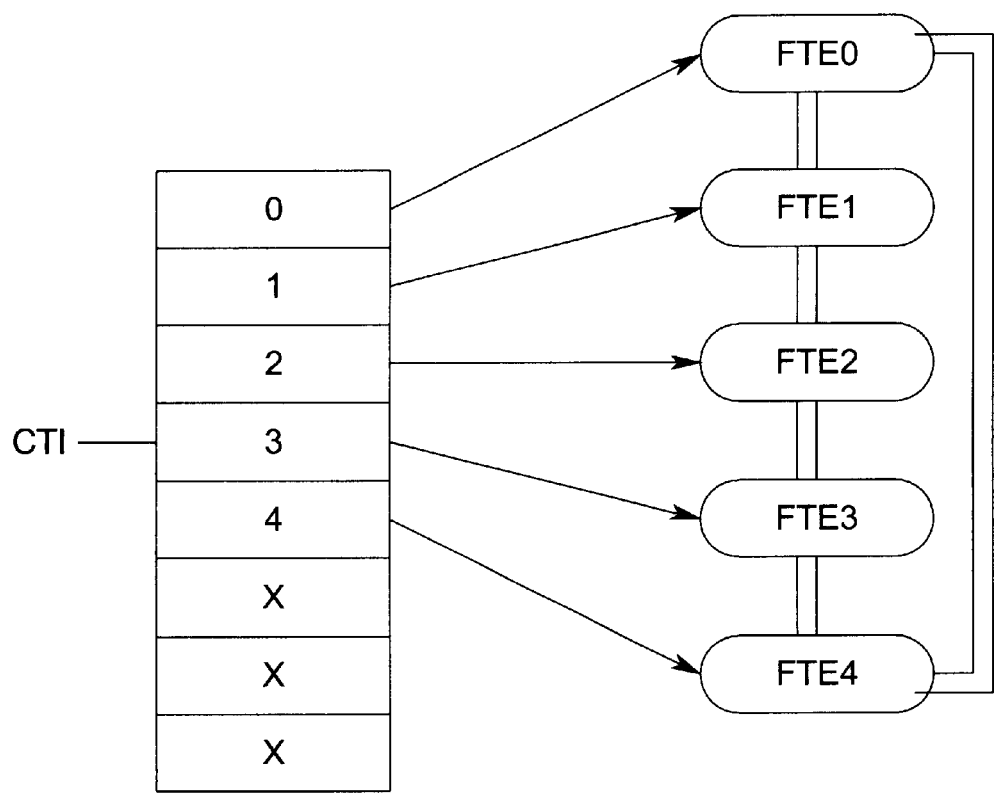
Figure 4C:
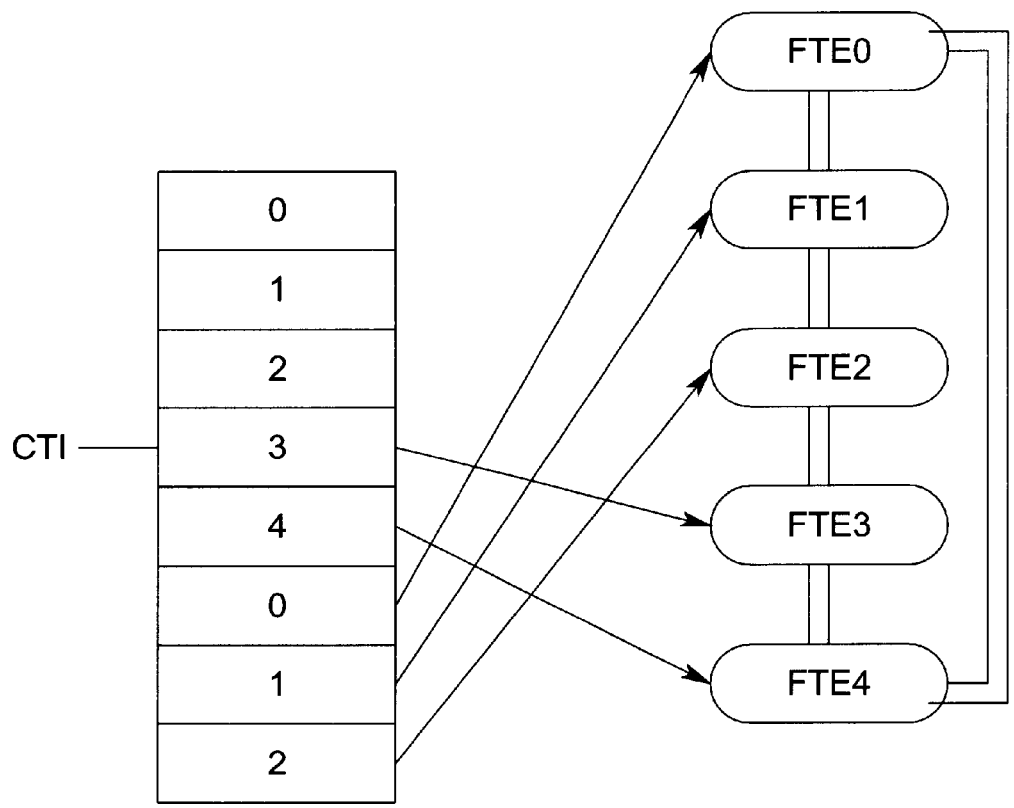
Figure 4D:
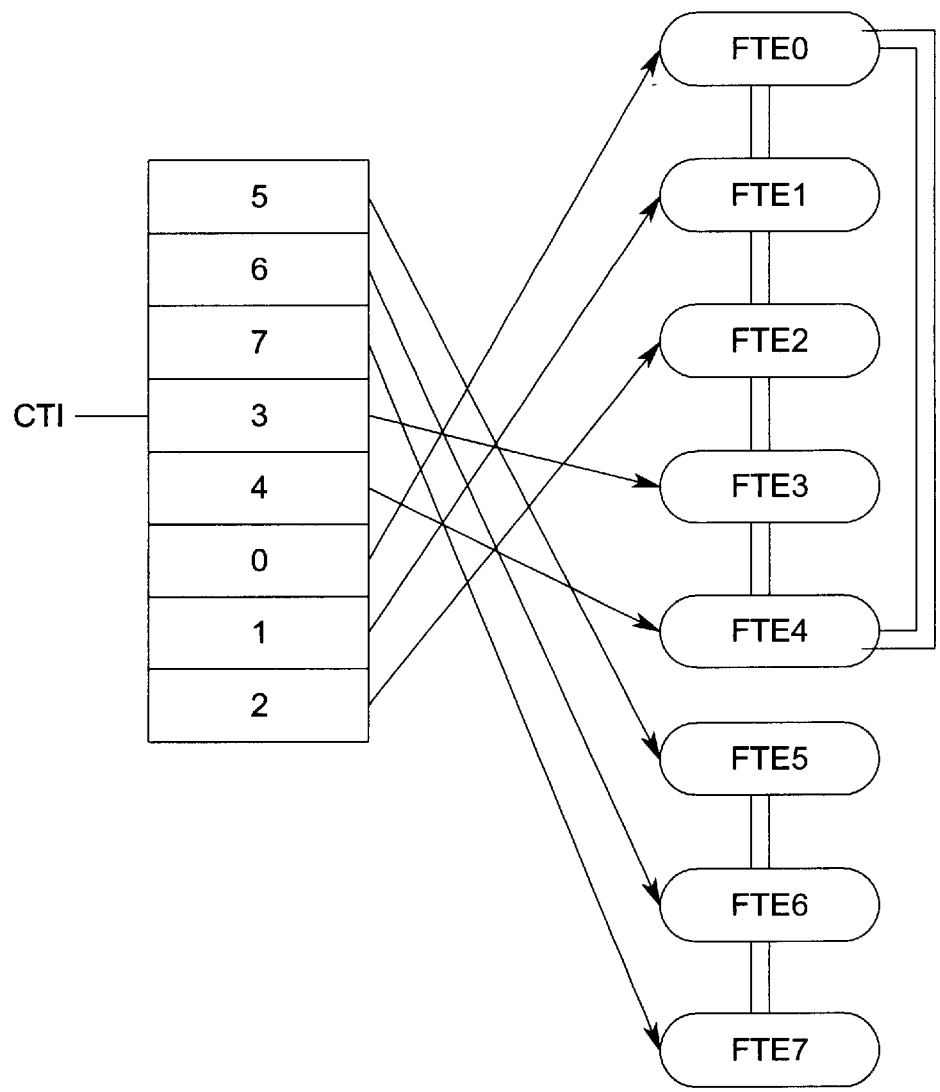
Figure 4E:
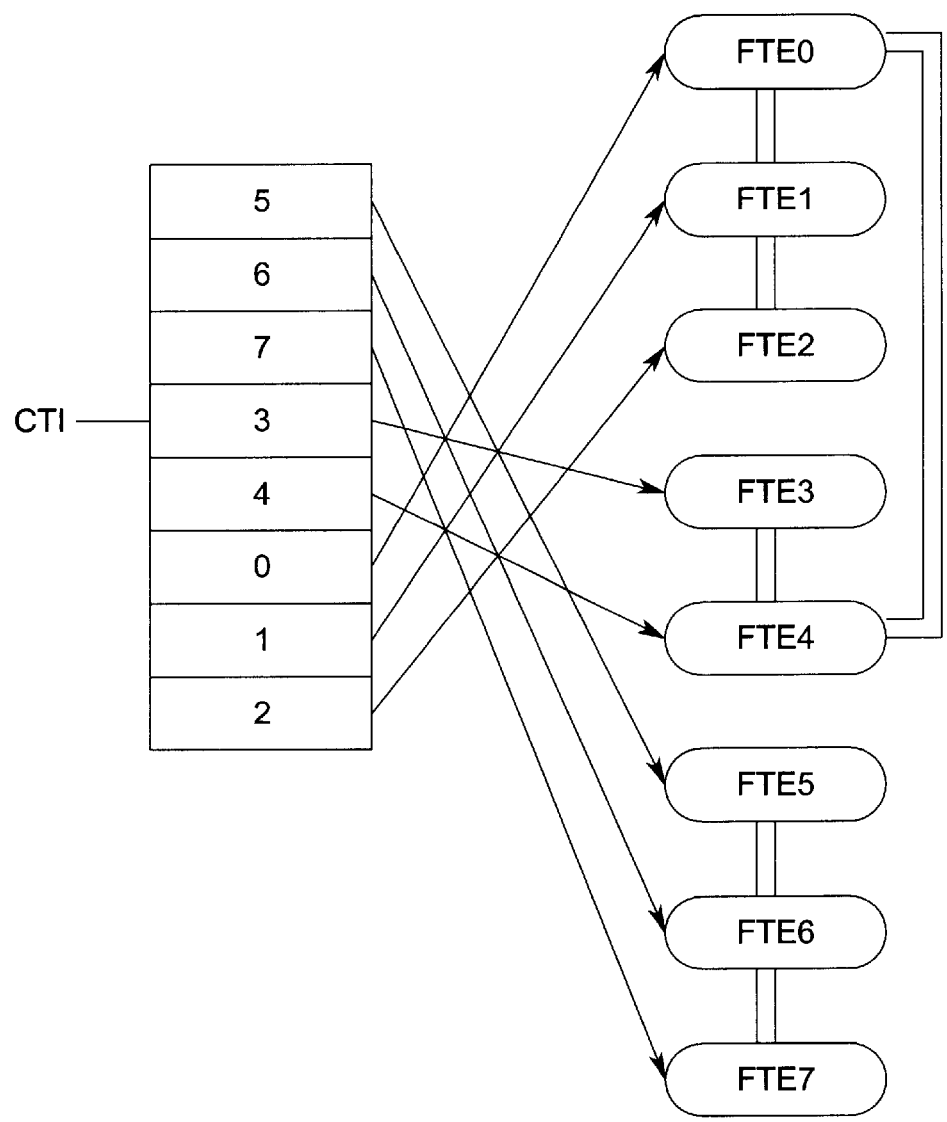
Figure 4F:
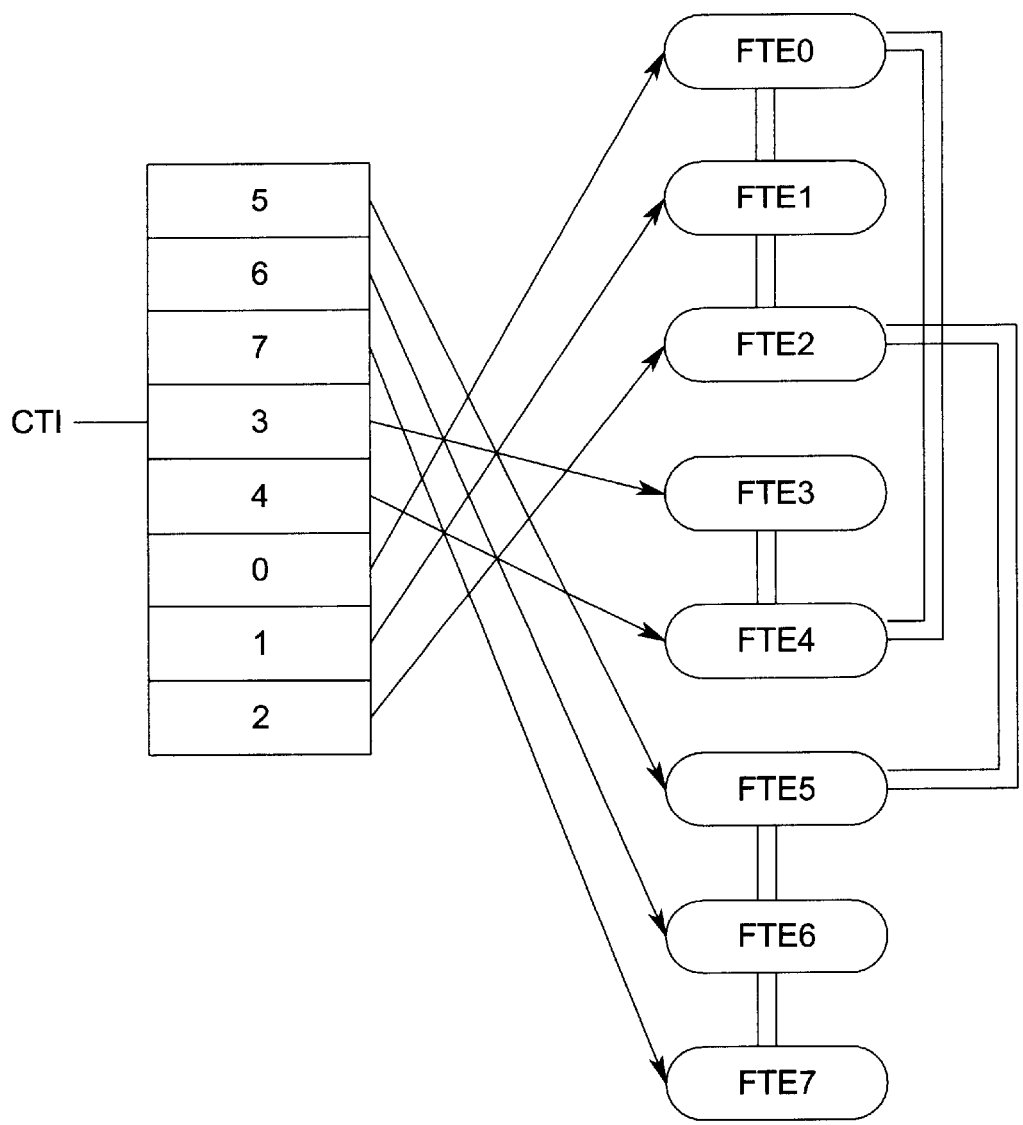
Figure 4G:
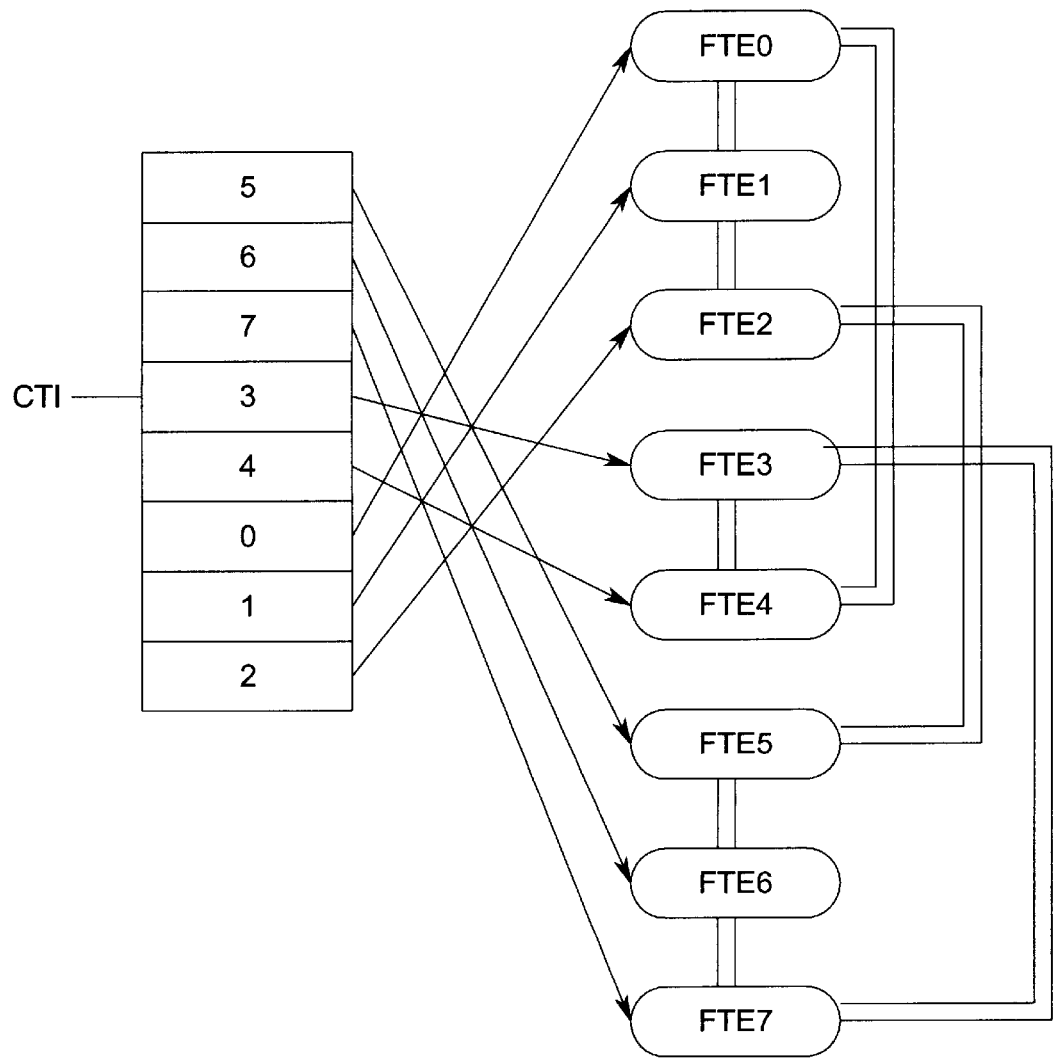
Figure 5:
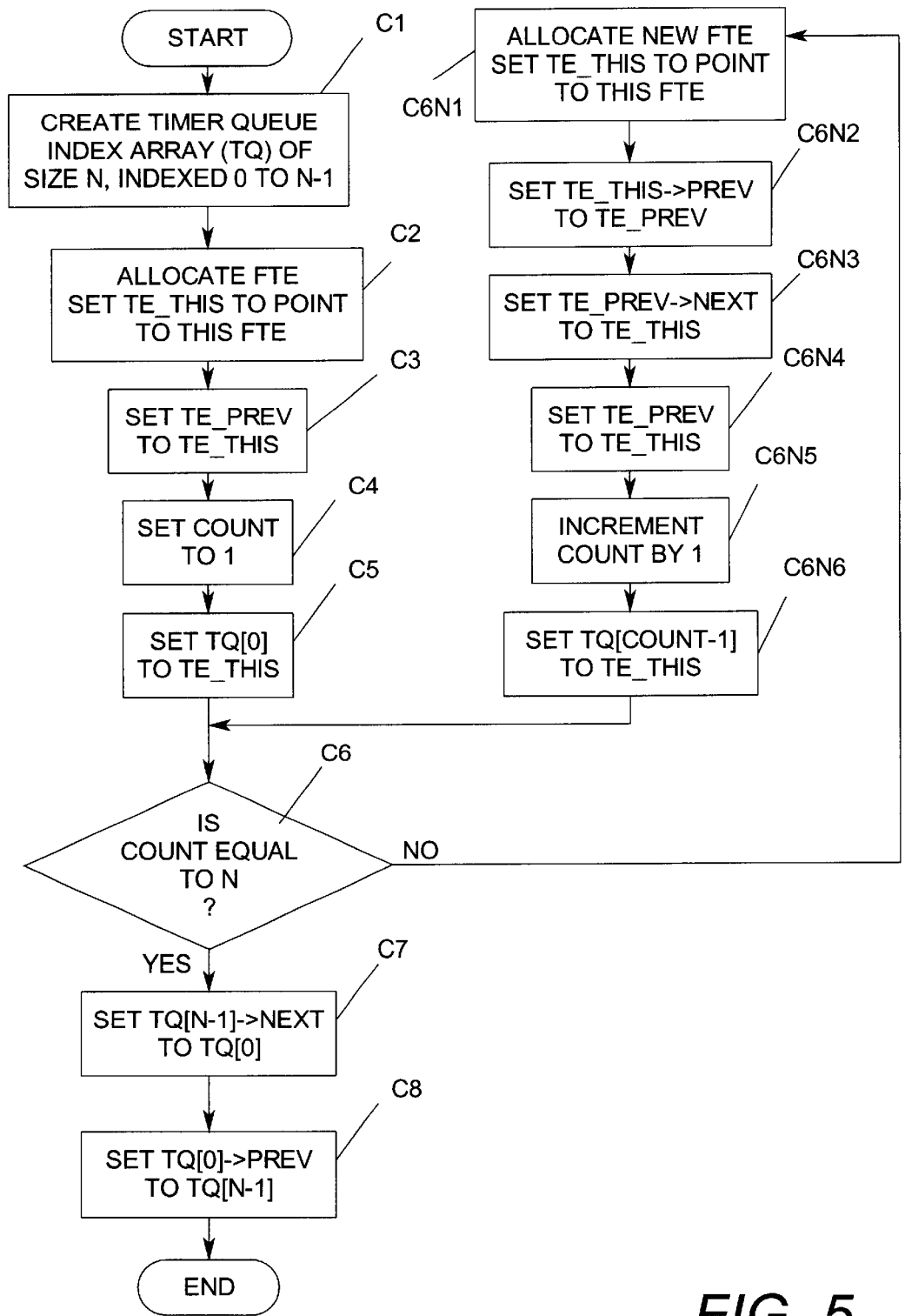
FIG. 5 is a flow chart showing the steps for creation of a circular queue.

FIG. 5 is a flow chart illustrating the creation of a Timer Queue. The Timer Queue is represented by the Timer Queue Index Array, which is an Address Array where each pointer within the array references a FTE, as was indicated in FIG. 4.

Each FTE will have a "previous pointer" pointing to the previous FTE referenced by the array, and a "next" pointer pointing to the next FTE referenced by the array. The FTE referenced by the first index of the array will assign a previous pointer to the FTE referenced by the last index of the array. The FTE referenced by the last index of the array will assign a next pointer to the FTE referenced by the first index of the array.

Now referring to the flow chart steps of FIG. 5, a sequence is shown of steps C1 through C8.

Step C1 involves creation of a Timer Queue Index Array, designated TQ, of size N which is indexed from 0 to N−1. There will be N Fixed Timer Entries (FTE).

At step C2, the program will create an instance of a FTE and set $TE_{13}$ THIS to point to it.

At step C3, the program will set $TE_{13}$ PREV equal to $TE_{13}$ THIS.

At step C4, the program will set the Count, or the current number of FTEs, to 1.

At step C5, the program will set TQ[0] to $TE_{13}$ THIS.

At step C6, a decision block considers the question of "is the Count yet equal to N?"

If the answer here is "NO" at this time, then step C6N1 will create a new Fixed Timer Entry (FTE) and set $TE_{13}$ THIS to point to it.

Then step C6N2 will assign $TE_{13}$ PREV to $TE_{13}$ THIS→PREV, thus creating a link from the current FTE to the previously created FTE. At step C6N3, the program will assign $TE_{13}$ THIS to $TE_{13}$ PREV→NEXT, thus creating a link from the previously created FTE to the current FTE. By assigning a previous pointer in step C6N2 and a "next" pointer in step C6N3 for the two adjacent FTEs ($TE_{13}$ THIS and TE_PREV), the FTEs become doubly linked, as was indicated in. FIGS. 3B and 3C.

Step C6N4 then sets $TE_{13}$ PREV to the present timer entry $TE_{13}$ THIS.

At step C6N5, the Count will be incremented by 1.

Step C6N6 works to assign $TE_{13}$ THIS to TQ[Count−1] (Timer Queue (TQ) at index Count−1), and returns to C6.

Steps C6N1 through C6N6 will loop until N FTEs have been created and doubly linked and their addresses stored within the Timer Queue Index Array TQ.

Now, when step C6 is YES (Count=N), then step C7 operates to assign TQ[0] to TQ[N−1]→NEXT (the next pointer for the FTE pointed to by TQ at index (N−1) to point to the FTE entry pointed to by TQ at index 0), thus creating a link from the last FTE to the first FTE.

At step C8, the program will assign TQ[N−1] to TQ[0] →PREV (the previous pointer for the FTE entry pointed to by TQ at index 0 to point to the FTE entry pointed to by TQ at index N−1), thus creating a link from the first FTE to the last FTE. By setting the "next" pointer in step C7 and the "previous" pointer in C8 for the first and last FTEs (TQ[0] and TQ[N−1]), all the FTEs referenced by TQ become Circularly Linked.

Thus, there has been created an Array having entries mapped to the Fixed Timer Entries of the Circularly Linked List of FIG. 3A. The combination of the Address Array 17 (FIG. 2A) and the circularly linked list (FIG. 3A) now form the Timer Queue.

Figure 6A:
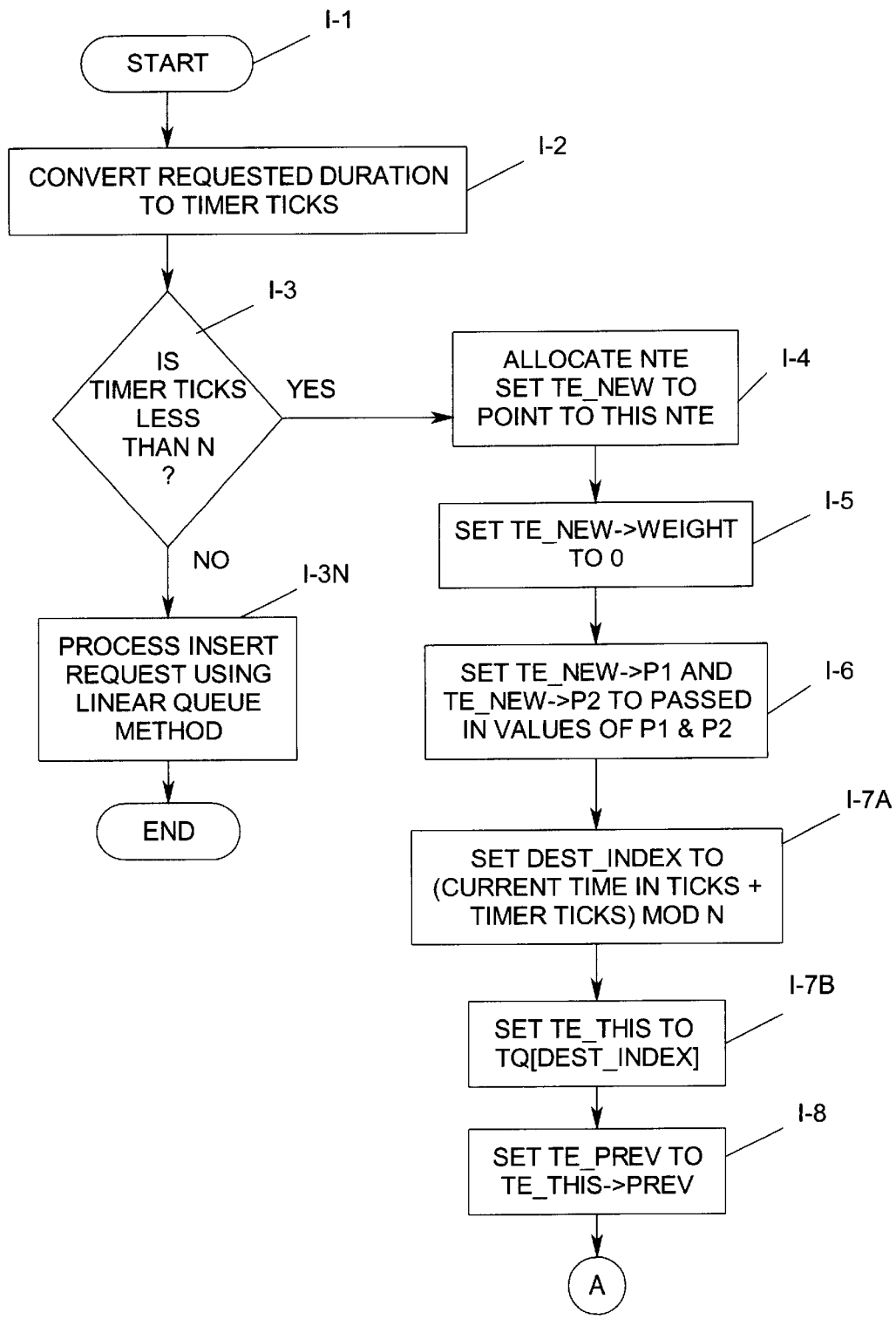
FIG. 6 is a flowchart comprised of FIGS. 6A and 6B for illustrating the insertion of a New Timer Entry (NTE), (also called a Transient Timer Entry, TTE).
Figure 6B:
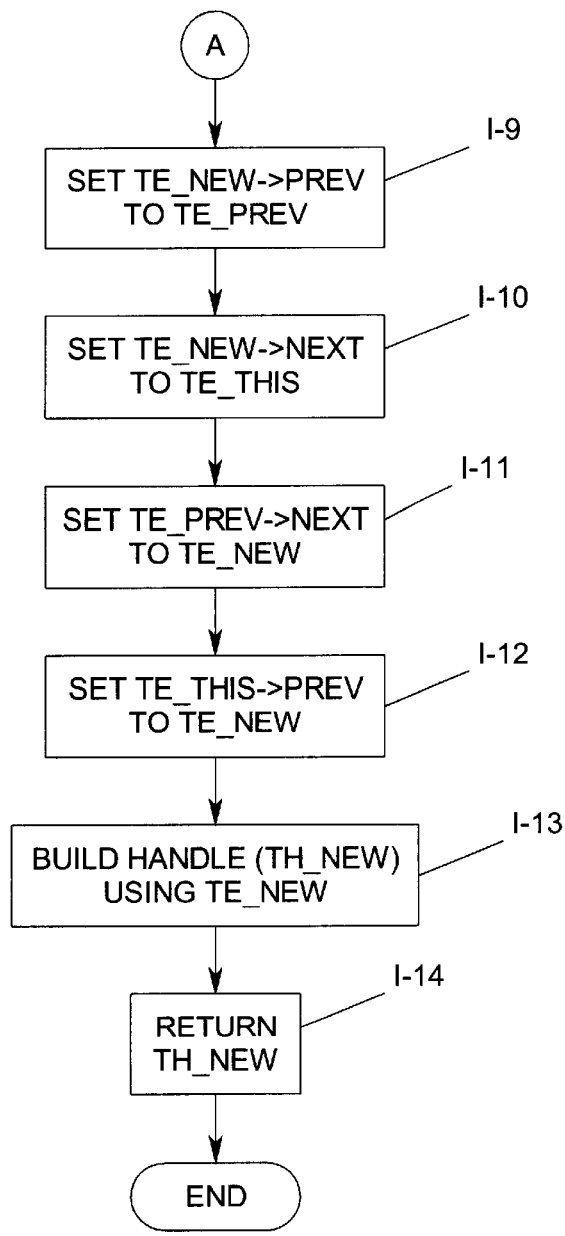

FIGS. 6A and 6B now show a flow chart, which illustrates the steps for insertion of a Transient Timer Entry in an established circular Timer Queue.

Referring to FIG. 6A, the start step at I-1 indicates that an Insertion Request for a New Timer Entry (NTE) has been initiated. Then step I-2 operates to convert the requested duration to Timer Ticks.

Step I-3 shows a decision block to query—"are the Timer Ticks less than N?" If the answer is NO (i.e. Timer Ticks greater than or equal to N), then at step I3N, the program will process a New Timer request by using a linear queue method and then exit.

At step I-3 when the timer ticks are less than N (YES), then Step I-4 operates to create a New Timer Entry (NTE) pointed to by TE_NEW.

Then step I-5 will set the Weight Value to "0" (i.e. $TE_{13}$ NEW→WEIGHT=0). As a result, the NTE will not consume any timer ticks. At step I-6, the program will set $TE_{13}$ NEW→P1 and $TE_{13}$ NEW→P2 to include the values ascribed to P1 and P2. This will specify the Event, or the occurrence of the process associated with $TE_{13}$ NEW.

At step I-7A, the program will calculate the TQ index $DEST_{13}$ INDEX identifying the Fixed Timer Entry (FTE) where the insert will occur using the formula ("Current Timer Index"+"Timer Ticks") mod "N". The TE pointed to by $TE_{13}$ NEW will be inserted just prior to this FTE.

At step I-7B, $TE_{13}$ THIS is set to point to this FTE entry using DEST_INDEX.

At step I-8, the program sets $TE_{13}$ PREV to point to the TE immediately preceding the TE pointed to by $TE_{13}$ THIS (i.e. $TE_{13}$ PREV=$TE_{13}$ THIS→PREV). The sequence then continues via marker A to FIG. 6B. Step I-9 involves setting the "previous" pointer of the TE identified by $TE_{13}$ NEW to $TE_{13}$ PREV, thus creating a link from the NTE to the previous TE.

At step I-10, the program sets the "next" pointer of the TE identified by $TE_{13}$ NEW to $TE_{13}$ THIS, thus creating a link from the NTE to the current FTE.

Step I-11 involves setting the next pointer of the TE identified by TE_PREV to $TE_{13}$ NEW, thus creating a link from the previous TE to the NTE.

Step I-12 sets the previous pointer of the TE identified by $TE_{13}$ THIS to $TE_{13}$ NEW, thus creating a link from the current FTE to the NTE.

Step I-13 builds a handle (reference to an address in memory) to identify the New Timer Entry (NTE) being inserted in the Timer Queue. $TH_{13}$ NEW (Timer Handle) is built from $TE_{13}$ NEW (of I-12).

Then at Step I-14, the sequence operates to return $TH_{13}$ NEW so that the program initiating the Insert Request can uniquely identify their request.

Thus, the New Timer Entry NTE ($TE_{13}$ NEW) will now exist in the Timer Queue at the designated point between two of the Timer Entries (TEs) which had been selected through the "Current Timer Index" plus "requested duration in timer ticks".

Thus, it is seen that the present system utilizes a circular queue with a moving time-origin point. The moving time-origin point sets-up a new "start" reference point and provides an "end" point when the required number of ticks have been kicked past to the position of the inserted New Timer Entry.

Thus, it is also seen that there is an immediate operation which allows multiple accessible insertion points to be placed within the queue with no requirement for a long sequential term of scanning of every single event in a queue in order to find a new insertion point, as was required in previous systems.

Now it may be seen that after creation of a circular queue and the insertion of new timer entries (NTEs), the occasions then arise when it is desired to increase the capacity of the circular queue. FIGS. 4A through 4G, and FIG. 7 will delineate such procedures. This expansion of the capacity of the circular queue is the subject matter of the present invention and will be discussed hereinafter.

FIG. 4 is a schematic drawing of the steps involved in dynamically increasing the capacity of the circular queue, and includes FIGS. 4A through 4G.

FIG. 4A shows an example of a pointer array of addresses 0–4 with each address pointing to Fixed Timer Entries FTE0, FTE1, FTE2, FTE3, and FTE4 which (in circular fashion) sequences back to FTE0. The "Current Timer Index" (CTI) is set to address 3.

FIG. 4B illustrates extending the pointer array by adding 3 new entries after address 4. The values for these addresses are initialized to nil.

FIG. 4C is an illustration of "copying" FTE values to the newly added pointer array entries. Here, the method of the present invention copies FTE0 to the first "added array" entry, then FTE1 to the second array entry, and FTE2 to the third array entry.

FIG. 4D is an illustration of allocating, saving, and linking new FTEs. The method of the present invention allocates 3 new FTEs, designated FTE5, FTE6, and FTE7. The method saves addresses FTE5, FTE6, and FTE7 where address 0, address 1, and address 2 were originally. After saving the addresses for the newly created FTEs, the method doubly-links FTE5 to FTE6, and FTE6 to FTE7.

FIG. 4E illustrates the breaking of the circular queue. The method of the present invention breaks the double-link between the address at CTI and the address previous to CTI. Because CTI is set to address 3, the double-link between FTE2 and FTE3 is destroyed.

FIG. 4F illustrates joining the original linear queue with the linear queue comprised of the newly created FTEs. Here, the method of the present invention creates a double-link between FTE2 and FTE5.

Finally, FIG. 4G illustrates converting the joined linear queue into a circular queue. Here, the method of the present invention creates a double-link between FTE3 and FTE7.

Following the steps completed in FIG. 4G, the circular queue's capacity (N) is increased by 3 timer ticks. Before increasing the capacity of the queue, the circular queue was limited to requests with durations of 5 ticks or less. After the dynamic increase in capacity, however, the circular queue is now capable of handling durations of 8 ticks or less. FIGS. 4A through 4G is one example of dynamically increasing the capacity of the circular queue, FIG. 7 is a flow chart showing the general steps involved for dynamically increasing the capacity of the circular queue. FIG. 7 is comprised of FIGS. 7A, 7B, 7C, and 7D.

Figure 7A:
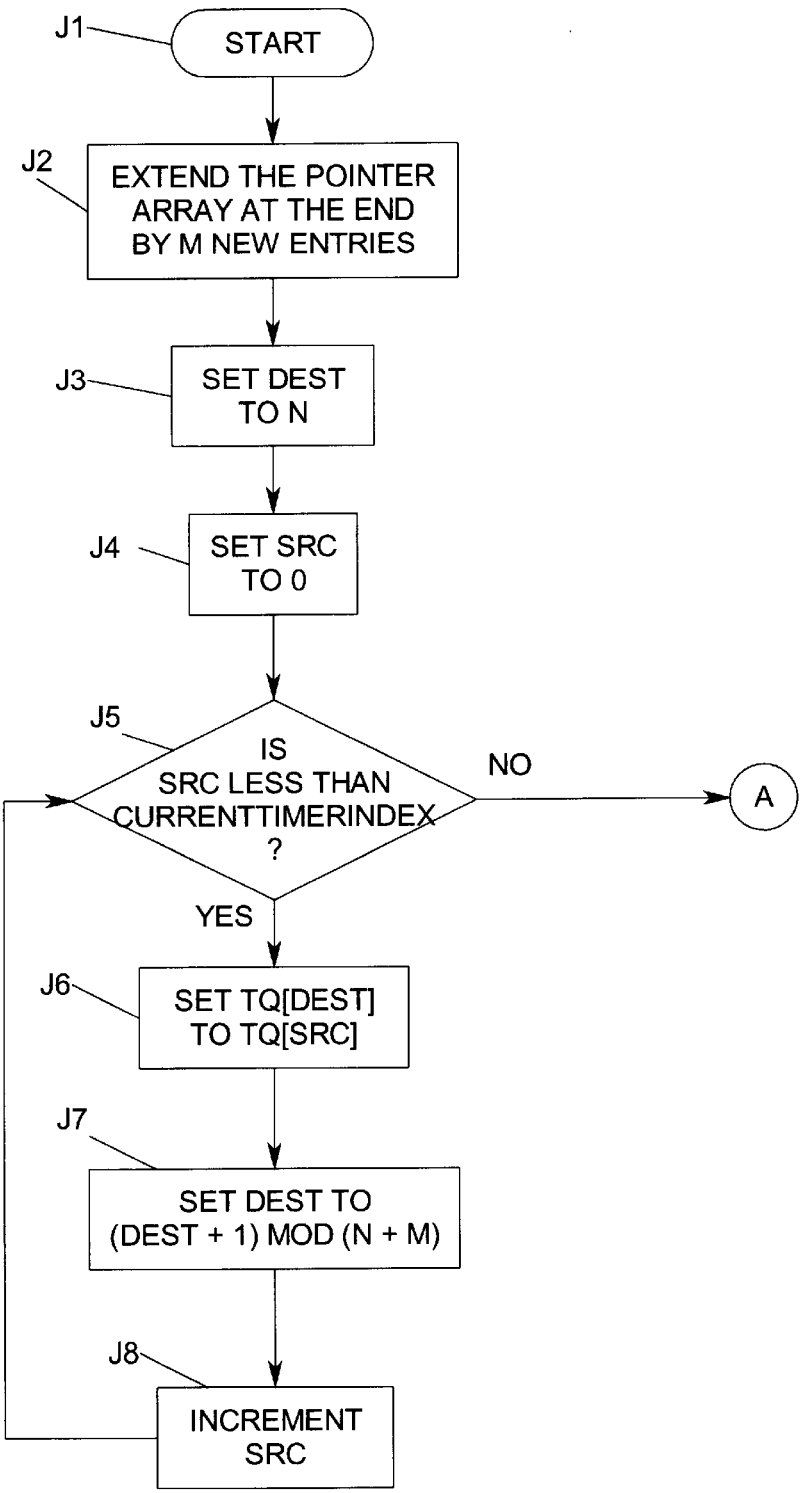
FIG. 7 is a flowchart comprised of FIGS. 7A through 7D for illustrating the dynamic increase of capacity for the circular queue.

Referring now to FIG. 7A, the process steps of extending the pointer array at the end by M new entries, copying the first "Current Timer Index" pointer array entries to indexes N onwards, and wrapping around to index 0 (if necessary) after index N+M−1 are shown. The process begins with start bubble J1 followed by a process step (block J2) of extending the pointer array at the end by M new entries. The process then continues by setting the DEST variable to N, or the size of the timer queue (block J3). After this, the SRC variable is initialized to 0 (block J4). After initializing SRC, a decision is made as to whether the value of SRC is less than "Current Timer Index" (diamond J5). If the answer to this inquiry is yes, the value of the TQ at index SRC is copied to TQ[DEST] (block J6). This is followed by process step (block J7), which sets DEST to (DEST+1) mod (N+M). Block J7 wraps around to index 0, if necessary. This process then continues by incrementing SRC by 1 (block J8), and loops back around to decision diamond J5. When the answer to decision diamond J5 is NO, the process continues in FIG. 7B.

Figure 7B:
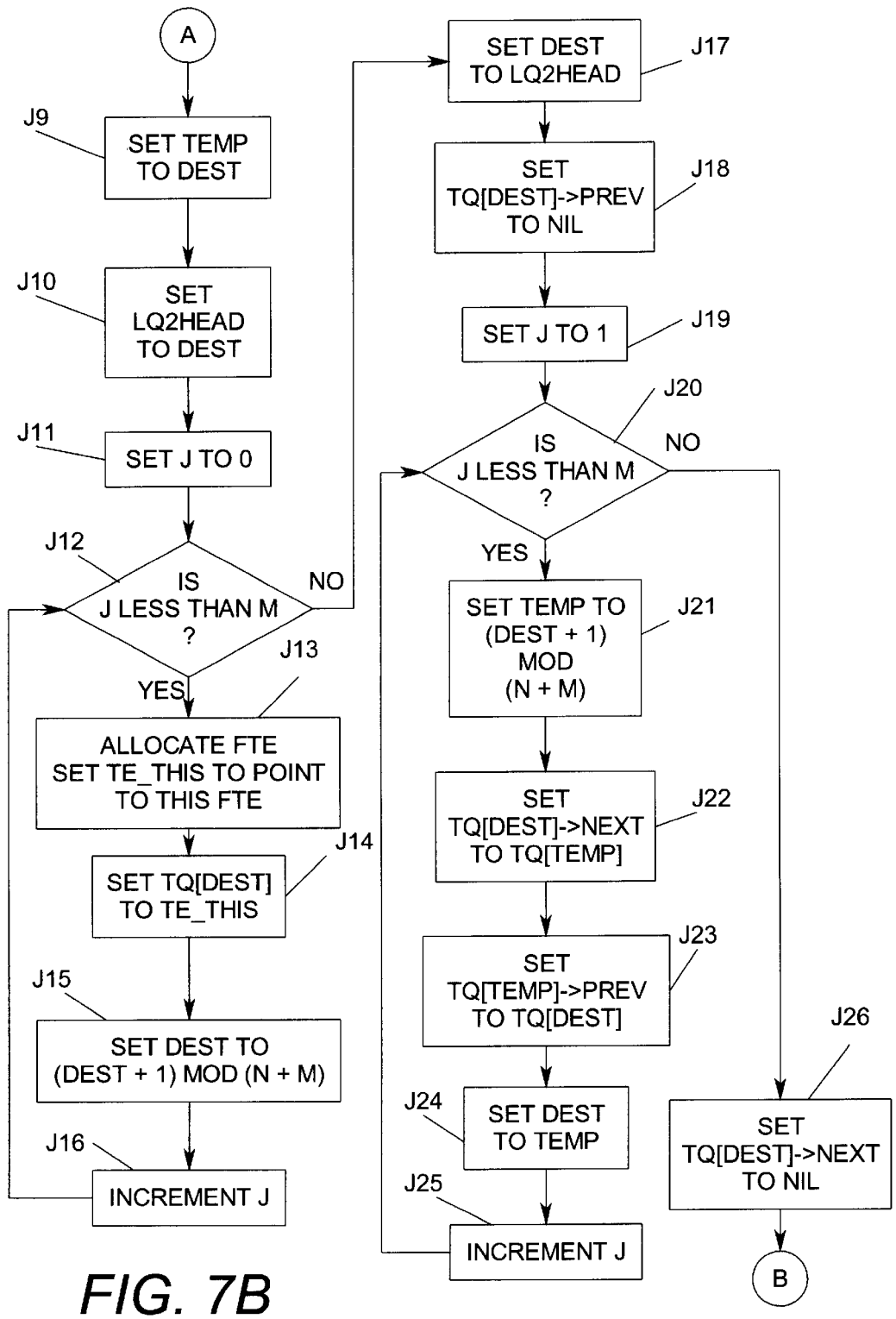

With reference to FIG. 7B, the process steps of allocating M more FTEs, saving the addresses for the newly created FTEs in the pointer array at indices DEST onwards, and linking the FTEs to make a linear queue LQ2 are shown. First, the value of variable TEMP is set to DEST (block J9). TEMP is used as a placeholder for the original value of DEST. After setting TEMP, the variable LQ2HEAD is set to DEST (block J10). The process then continues with a process step (block J11) to initialize J to 0. J acts as a loop counter. After initializing J, an inquiry is made as to whether or not the value of J is less than M (diamond J12). If the answer to this inquiry is yes, the process continues by allocating an FTE and setting $TE_{13}$ THIS to point to it (block J13). Timer queue TQ at index DEST is then set to point to the newly created FTE (block J14). This is followed by a process step of wrapping DEST around back to 0, if necessary (block J15) and incrementing J for the next loop iteration (block J16). The process then returns to decision diamond J12. When the answer to the inquiry posed by decision diamond J12 is NO, a process step (block J17) sets the variable DEST to LQ2HEAD. The process continues by setting the previous pointer of the FTE identified by TQ at index DEST to nil (block J18). After setting the previous pointer, J is set to 1 (block J19). A decision block (diamond J20) makes an inquiry as to whether or not J is less than M. If the answer to this inquiry is YES, a process step (block J21) sets variable TEMP to (DEST+1) mod (N+M). Block J21 sets TEMP as the next element of LQ2. The process then continues by linking the next pointer for the FTE identified by TQ[DEST] to TQ[TEMP] (block J22). The previous pointer for the FTE identified by TQ[TEMP] is then set to TQ[DEST] (block J23). By setting the next and previous pointers a double-link is established. After creating a double-link, the process continues by setting DEST to TEMP (block J24), and incrementing J (block J25). The process then returns to decision diamond J20. When the answer to decision diamond J20 is NO, a process step (block J26) initializes the next pointer for the FTE identified by TQ[DEST] to nil.

Figure 7C:
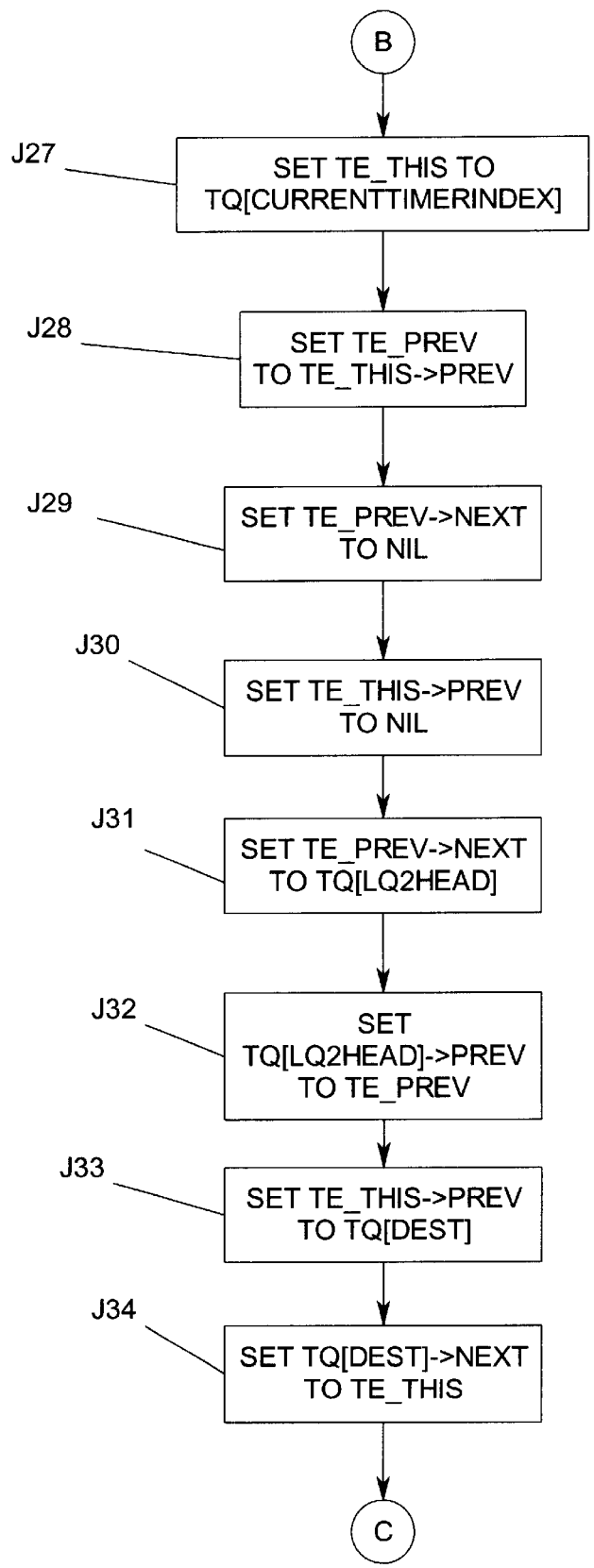

Referring now to FIG. 7C, the process steps are shown of "breaking" the existing circular queue and making it a linear queue LQ1, making another linear queue LQ3 by joining LQ1 and LQ2, and converting the joined linear queue LQ3 into a circular queue. First, the process sets $TE_{13}$ THIS to TQ at index "Current Timer Index" (block J27). This sets $TE_{13}$ THIS to point to the intended first element of LQ1. Then, a process step (block J28) sets $TE_{13}$ PREV to the point to the entry identified by TE_THIS→PREV. In other words, $TE_{13}$ PREV now points to the intended last element of LQ1. The next pointer for the TE identified by $TE_{13}$ PREV is then set to nil (block J29), and the previous pointer of the TE identified by $TE_{13}$ THIS is also set to nil (block J30). By setting the previous and next pointers to nil, the process breaks the link for the circular queue. The process continues by setting the next pointer of the TE identified by $TE_{13}$ PREV to TQ at index LQ2HEAD (block J31), thus joining LQ1 and LQ2 in the forward direction. The linear queue created by joining LQ1 and LQ2 shall be referred to as LQ3. A process step (block J32) sets the previous pointer for the TE identified by TQ at index LQ2HEAD to $TE_{13}$ PREV, thus joining LQ1 and LQ2 in the reverse direction and completing LQ3. Process step J33 then sets the previous pointer for the TE identified by $TE_{13}$ THIS to TQ at index DEST. Finally, the process sets the next pointer for the TE identified by TQ[DEST] to $TE_{13}$ THIS. By setting the previous pointer in block J33 and the next pointer in block J34, LQ3 is converted into a circular queue.

Figure 7D:
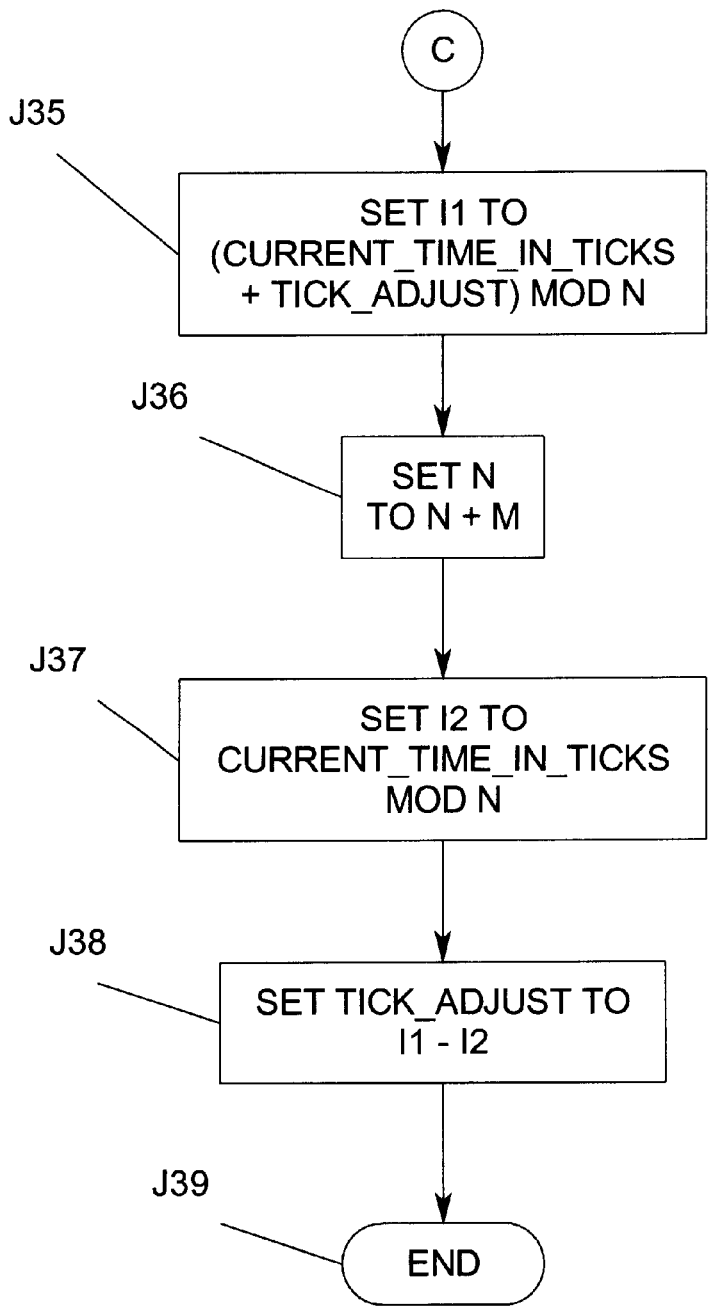

With reference to FIG. 7D, the process steps involved with setting the value of "Tick Adjust" are shown. First, the process sets I1 to ("Current Time In Ticks"+"Tick Adjust") mod N, (block J35). The process continues by incrementing N by M where N is the current size of the timer queue and M is the additional size added to N, (block J36). After setting N, I2 is set to "Current Time In Ticks" mod N (block J37). A process step (block J38) then sets "Tick Adjust" to the difference between I1 and I2. The process then exits (block J39).

Once "Tick Adjust" has been set as described in FIG. 7D, all future calculations within the timer queue of "Current Timer Index" must include the "Tick Adjust" value. In other words, "Current Timer Index" is set to ("Current Time In Ticks"+"Tick Adjust") mod N. By performing this calculation, the "Current Timer Index" is not affected by dynamically increasing the capacity of the timer queue.

Described herein has been a method for dynamically increasing the capacity of a circular queue which may have been expanded with one or more transient new timer entries (NTEs). The "Current Timer Index" is recalculated so as not to affect existing NTEs.

While one embodiment of the invention has been described, there can be other variations and implementations which are still encompassed by the attached claims.

What is claimed is:

1. In a circular queue having N fixed timer entries (FTEs) and a "Current Timer Index", a method for dynamically increasing the capacity of said circular queue by M comprising the steps of:

(a) extending a pointer array containing said circular queue by M;

(b) copying the first "Current Timer Index" entries;

(c) allocating M FTEs;

(d) linking said M FTEs within said circular queue;

(e) adjusting a "TICK ADJUST" value.

2. The method of claim 1 wherein step (b) includes the steps of:
- (b1) initializing a DESTINATION (DEST) index into said pointer array at index N;
- (b2) initializing a SOURCE (SRC) index into said pointer array at index 0;
- (b3) iterating through indices of said pointer array and copying values from said SOURCE (SRC) index to said DESTINATION (DEST) index for said "Current Timer Index" number of times.

3. The method of claim 1 wherein step (d) includes the steps of:
- (d1) saving addresses for said M FTEs in said pointer array;
- (d2) doubly-linking said M FTEs into a linear queue LQ2;
- (d3) converting the existing circular queue to a linear queue LQ1 and joining a linear queue LQ1 consisting of said N FTEs with said linear queue LQ2 of M FTEs into a linear queue LQ3;
- (d4) converting said linear queue LQ3 into a circular queue.

4. The method of claim 3 wherein step (d1) includes the step of:
- (d1a) determining a first element for said M FTEs;
- (d1b) iterating through indices of said pointer array starting with said first element and assigning an index to each of said M FTEs.

5. The method of claim 3 wherein step (d2) includes the step of:
- (d2a) determining a first element for said M FTEs;
- (d2b) iterating through indices of said pointer array starting with said first element and assigning a previous pointer and a next pointer for each of said M FTEs.

6. The method of claim 3 wherein step (d3) includes the step of:
- (d3a) setting a previous pointer for a current FTE within said pointer array at "Current Timer Index" to nil;
- (d3b) setting a next pointer for a previous FTE which precedes said current FTE to nil;
- (d3c) setting said next pointer for said previous FTE to point to an intended first element of said linear queue LQ2;
- (d3d) setting a previous pointer for said intended first element to point to said previous FTE.

7. The method of claim 3 wherein step (d4) includes the step of:
- (d4a) setting a previous pointer for an intended first element of LQ3 to an intended last element of LQ3;
- (d4b) setting a next pointer for said last element to said first element.

8. The method of claim 1 wherein step (e) includes the steps of:
- (e1) calculating (a "Current Time In Ticks" plus said "Tick Adjust" value) mod N and assigning it to an I1 variable;
- (e2) incrementing N by M;
- (e3) calculating said "Current Time In Ticks" mod N and assigning it to an I2 variable;
- (e4) calculating said I1 value minus said I2 value and assigning it to said "Tick Adjust" variable;
- (e5) calculating (said "Current Time In Ticks" plus said "Tick Adjust") mod N and assigning it to said "Current Timer Index" for all subsequent requests for said "Current Timer Index".

9. In a circular queue of N Fixed Timer Entries and a "Current Timer Index", a system for expanding the number of Fixed Timer Entries to N+M, where N and M are integers, comprising:
- (a) means to break the sequence of FTEs in said circular queue of N (FTEs) Fixed Timer Entries into a linear queue;
- (b) means to add M FTEs to the existing N FTEs;
- (c) means to re-establish the circular queue to form an enlarged circular queue of N+M total Fixed Timer Entries.

* * * * *